(12) United States Patent
Oka

(10) Patent No.: US 8,509,493 B2
(45) Date of Patent: Aug. 13, 2013

(54) BIOMETRIC IDENTIFICATION SYSTEM

(75) Inventor: Makoto Oka, Tokyo (JP)

(73) Assignee: Sony Corporation, Tokyo (JP)

( * ) Notice: Subject to any disclaimer, the term of this patent is extended or adjusted under 35 U.S.C. 154(b) by 1437 days.

(21) Appl. No.: 11/212,591

(22) Filed: Aug. 29, 2005

(65) Prior Publication Data

US 2006/0050931 A1 Mar. 9, 2006

(30) Foreign Application Priority Data

Sep. 7, 2004 (JP) ................................. 2004-259719

(51) Int. Cl.
*G06K 9/00* (2006.01)
(52) U.S. Cl.
USPC .......................................................... 382/115
(58) Field of Classification Search
USPC ................. 382/115, 116, 117, 118, 119, 120, 382/121, 122, 123, 124, 125, 128, 129, 130, 382/131, 132, 133, 134; 348/77, 78; 396/14, 396/15, 16, 17, 18; 707/6, 7; 713/186
See application file for complete search history.

(56) References Cited

U.S. PATENT DOCUMENTS

| | | | |
|---|---|---|---|
| 6,636,620 B1 * | 10/2003 | Hoshino | 382/124 |
| 6,963,975 B1 * | 11/2005 | Weare | 713/176 |
| 7,024,562 B1 * | 4/2006 | Flink et al. | 713/186 |
| 2002/0026581 A1 | 2/2002 | Matsuyama et al. | |
| 2004/0054630 A1 * | 3/2004 | Ginter et al. | 705/53 |

FOREIGN PATENT DOCUMENTS

| | | |
|---|---|---|
| EP | 1 271 279 A2 | 1/2003 |
| JP | 2003-286781 | 10/2003 |

OTHER PUBLICATIONS

Office Action issued Jan. 18, 2011, in Japan Patent Application No. 2004-259719.

* cited by examiner

*Primary Examiner* — Brian Le
(74) *Attorney, Agent, or Firm* — Oblon, Spivak, McClelland, Maier & Neustadt, L.L.P.

(57) ABSTRACT

A biometric identification system enabling biometric authentication without a user providing his or her biometric data to an authentication entity, including an interface for data input/output with an electronic device in a state attached to an attachment part provided at the electronic device or data input/output by proximity wireless communication with the electronic device, a biometric data detecting means for acquiring the biometric data from a living subject, a memory for storing identification use biometric data used for the biometric identification in a secure state, and a controlling means for performing processing for comparing the biometric data acquired by the biometric data detecting means with the identification use biometric data stored in the memory for identification and processing for outputting a predetermined request or predetermined data to the electronic device via the interface on the condition that the comparison processing has judged coincidence in the secure state.

13 Claims, 32 Drawing Sheets

USER REGISTRATION PROCESSING (ST2)

ELECTRONIC DEVICE REGISTRATION PROCESSING (ST1)

R_BD

LOGIN PROCESSING (ST5)

PROCESSING WITH RESPECT TO CONTENT KEY DATA CONT_K

LICENSE ACQUISITION PROCESSING (ST8)

LICENSE ACQUISITION PROCESSING (ST8)

FIG. 26A

| PCONT_ID |
|---|
| U_ID DESIRED TO BE USED |
| DESIRED TERMS OF USE |
| HASH DATA H (f) |

Sig.(U_SK)

R_COUPON

FIG. 26B

| COUPON_ID |
|---|
| PCONT_ID |
| ACCOUNT APPARATUS ID |
| LICENSED PERSON (USER ID) |
| TERMS OF USE |
| HASH DATA H (f) |
| RECEIVED SUM |

Sig.(S_SK)

COUPON

FIG. 31

| CER_BD_D |
|---|
| ISSUANT ID |
| EXPIRATION |
| U_D |
| R_BD |
| SIGNATURE DATA |

CER_BD

FIG. 32A

| PCONT_ID |
|---|
| U_ID DESIRED TO BE USED |
| DESIRED TERMS OF USE |
| CER_BD |

Sig.(U_SK)

R_COUPON

FIG. 32B

| COUPON_ID |
|---|
| PCONT_ID |
| ACCOUNT APPARATUS ID |
| LICENSED PERSON (User ID) |
| TERMS OF USE |
| CER_BD |
| RECEIVED SUM |

Sig.(5_SK)

COUPON

CER_BD :BIOMETRIC DATA CERTIFICATE DATA

BIOMETRIC IDENTIFICATION SYSTEM

CROSS REFERENCES TO RELATED APPLICATIONS

The present invention contains subject matter related to Japanese Patent Application No. 2004-259719 filed in the Japan Patent Office on Sep. 7, 2004, the entire contents of which being incorporated herein by reference.

BACKGROUND OF THE INVENTION

1. Field of Invention

The present invention relates to a biometric identification system for authentication utilizing biometric data.

2. Description of the Related Art

There is a system for authenticating the legitimacy of a user in transactions etc. via a network by detecting for example a fingerprint, vein pattern, retinal pattern, or other biometric data from the user and comparing this with identification use biometric data previously held by the authentication system.

In such a system, it is necessary to provide previously acquired identification use biometric data to the authentication system. The entity running the authentication system has to be highly reliable. However, users cannot obtain a correct grasp the reliability of the entity and therefore do not want to provide their own identification use biometric data to the entity. Further, in recent years, P2P (Peer to Peer) communication for communication between terminals without going through a server on the network has been spreading. Since such P2P communication communicates without going through a server, however, there is the problem that such a conventional system does not allow biometric authentication.

SUMMARY OF THE INVENTION

It is therefore desirable to provide a biometric identification system enabling biometric authentication without a user providing his or her biometric data to an authentication entity.

To solve the problem of the related art mentioned above, according to the present invention, there is provided a biometric identification system comprising an interface for data input/output with an electronic device in a state attached to an attachment part provided at the electronic device or data input/output by proximity wireless communication with the electronic device, a biometric data detecting means for acquiring the biometric data from a living subject, a memory for storing identification use biometric data used for the biometric identification in a secure state, and a controlling means for performing processing for comparing the biometric data acquired by the biometric data detecting means with the identification use biometric data stored in the memory for identification and processing for outputting a predetermined request or predetermined data to the electronic device via the interface on the condition that the comparison processing has judged coincidence in the secure state.

According to the present invention, there is provided a biometric identification system comprising: an interface for data input/output with an electronic device in a state attached to an attachment part provided at the electronic device or data input/output by proximity wireless communication with the electronic device, a biometric data detecting circuit for acquiring the biometric data from a living subject, a memory for storing identification use biometric data used for the biometric identification in a secure state, and a controlling circuit for performing processing for comparing the biometric data acquired by the biometric data detecting circuit with the identification use biometric data stored in the memory for identification and processing for outputting a predetermined request or predetermined data to the electronic device via the interface on the condition that the comparison processing has judged coincidence in the secure state.

According to the present invention, therefore, it is possible to provide a biometric identification system enabling biometric authentication without a user providing his or her biometric data to an authentication entity.

BRIEF DESCRIPTION OF THE DRAWINGS

These and other objects and features of the present invention will become clearer from the following description of the preferred embodiments given with reference to the attached drawings, wherein:

FIG. 26 is a diagram for explaining the license acquisition processing ST8 shown in FIG. 5;

FIG. 31 is a diagram for explaining the second modification of the embodiment of the present invention; and FIGS. 32A and 32B are diagrams for explaining the second modification of the embodiment of the present invention.

DESCRIPTION OF THE PREFERRED EMBODIMENTS

Below, an explanation will be given on a data processing system as an embodiment to which the biometric identification system of the present invention is applied.

Figure 1:
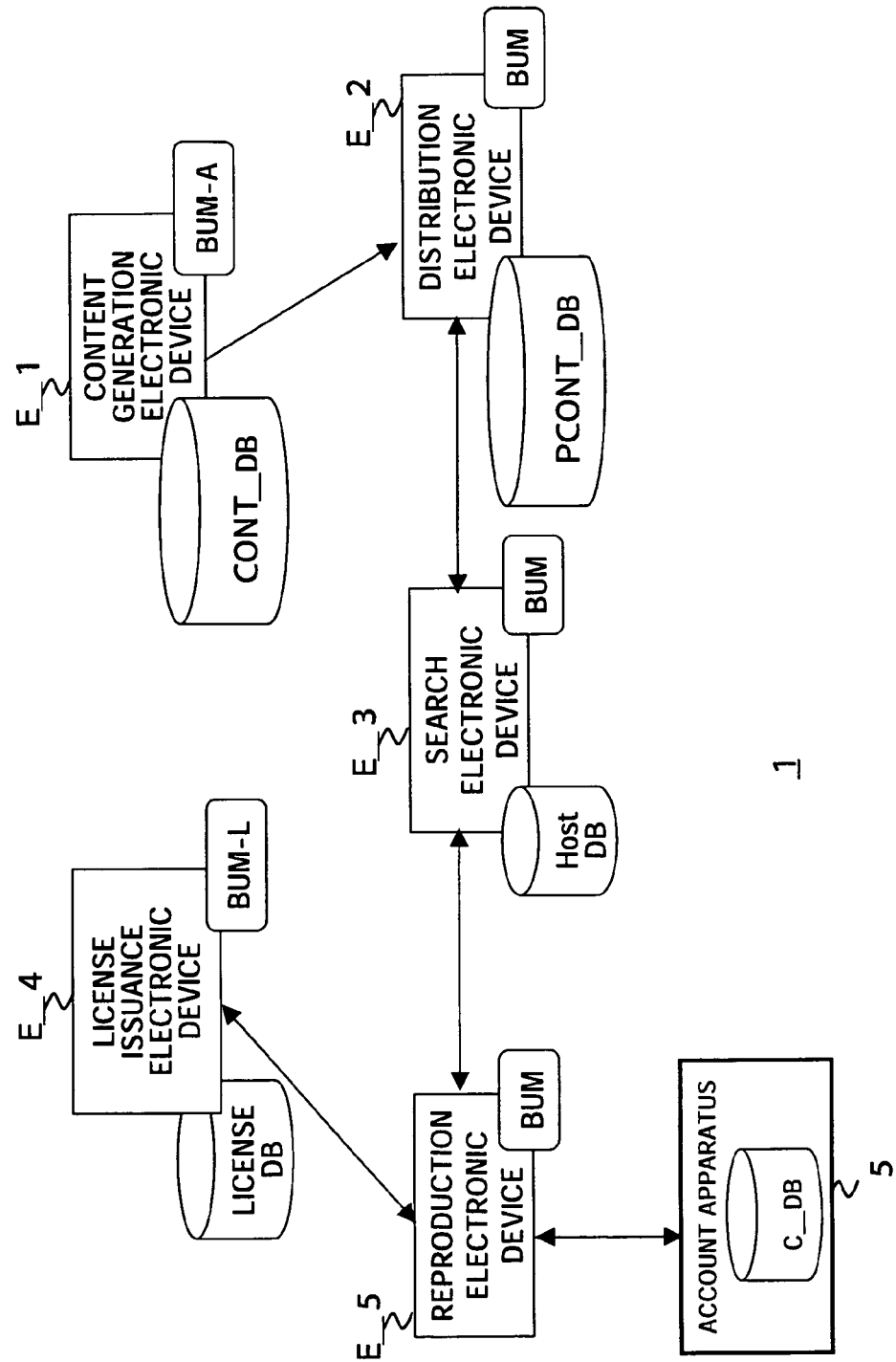
FIG. 1 is a view of the overall configuration of a data processing system of an embodiment of the present invention.

FIG. 1 is a view of the overall configuration of a data processing system 1 of an embodiment of the present invention. As shown in FIG. 1, the data processing system 1 has for example a content generation electronic device E_1, distribution electronic device E_2, search electronic device E_3, license issuance electronic device E_4, reproduction electronic device E_5, account apparatus 5, and user biometric processing modules BUM, BUM-L, and BUM-A.

Below, a detailed explanation will be given of the components shown in FIG. 1.

Electronic Device E

Figure 2:
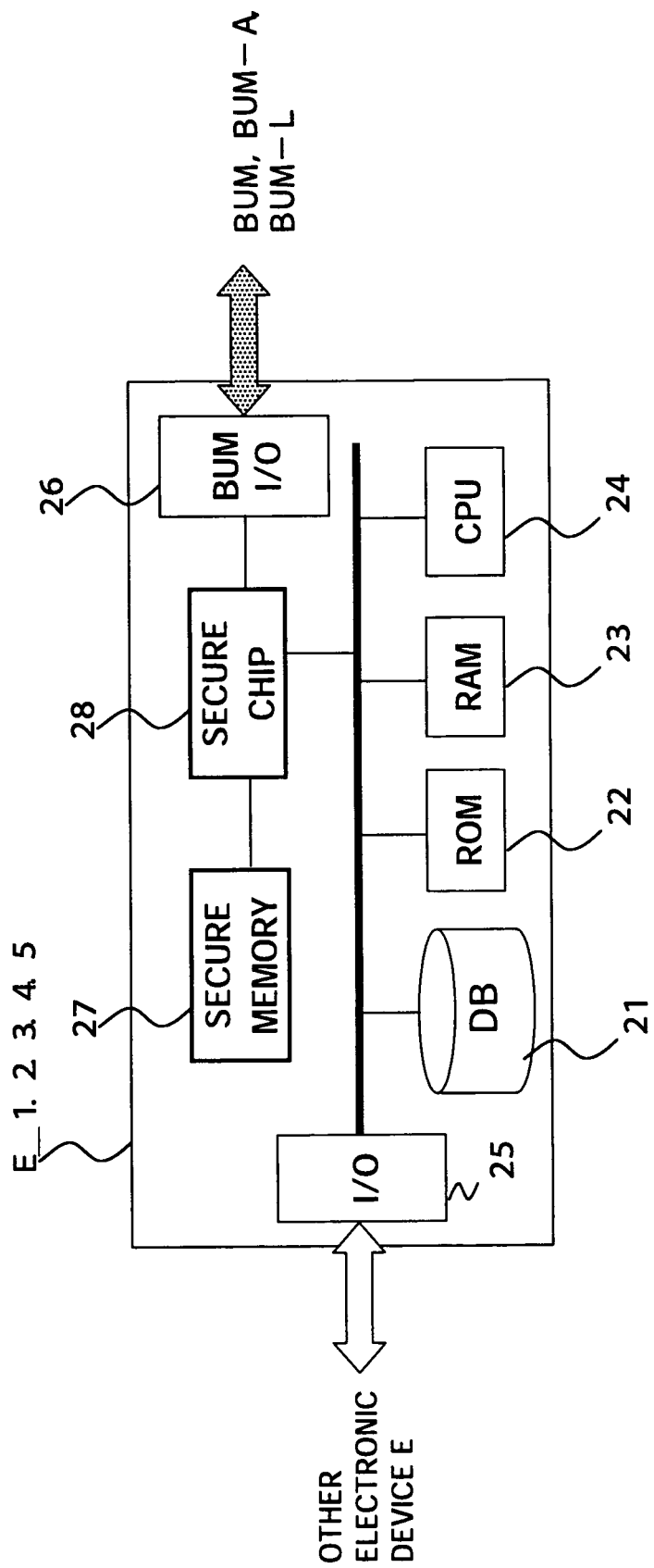
FIG. 2 is a view of the configuration of a content generation electronic device E_1, distribution electronic device E_2, search electronic device E_3, license issuance electronic device E_4, and reproduction electronic device E_5 shown in FIG. 1.

FIG. 2 is a view of the configuration of the content generation electronic device E_1, distribution electronic device E_2, search electronic device E_3, license issuance electronic device E_4, and reproduction electronic device E_5 (hereinafter also described as "an electronic device E") shown in FIG. 1. As shown in FIG. 2, each electronic device E has for example a database 21, read only memory (ROM) 22, random access memory (RAM) 23, central processing unit (CPU) 24, interface 25, BUM interface 26, secure memory 27, and secure chip 28.

The database 21 stores the content data CONT. The ROM 22 stores programs executed in the CPU 24 and the secure chip 28 and data. The RAM 23 stores the data to be processed in the CPU 24 and the secure chip 28 or the data being processed. The CPU 24 centrally controls the operation of the electronic device E. The interface 25 is used for communication with other electronic devices E via the network etc. The BUM interface 26 is attached with the user biometric processing modules BUM, BUM-L, and BUM-A of the user corresponding to the electronic device E in its attachment parts and inputs/outputs data with the user biometric processing modules. Further, the BUM interface 26 may perform the proximity wireless communication by infrared rays with the user biometric processing modules BUM, BUM-L, and BUM-A.

The secure memory 27 is a tamperproof electronic circuit which stores the data used in the secure chip 28 in a secure state. The secure memory 27 stores for example device secret key data D_SK and device public key certificate data D_PKC of the electronic device E. The secure chip 28 is a tamperproof electronic circuit which performs processing concerning the user biometric processing modules BUM, BUM-L, and BUM-A in a secure state. The secure chip 28 performs for example encryption, decryption, signature processing, and signature verification.

User Biometric Processing Modules BUM, BUM-L, and BUM-A

Figure 3:
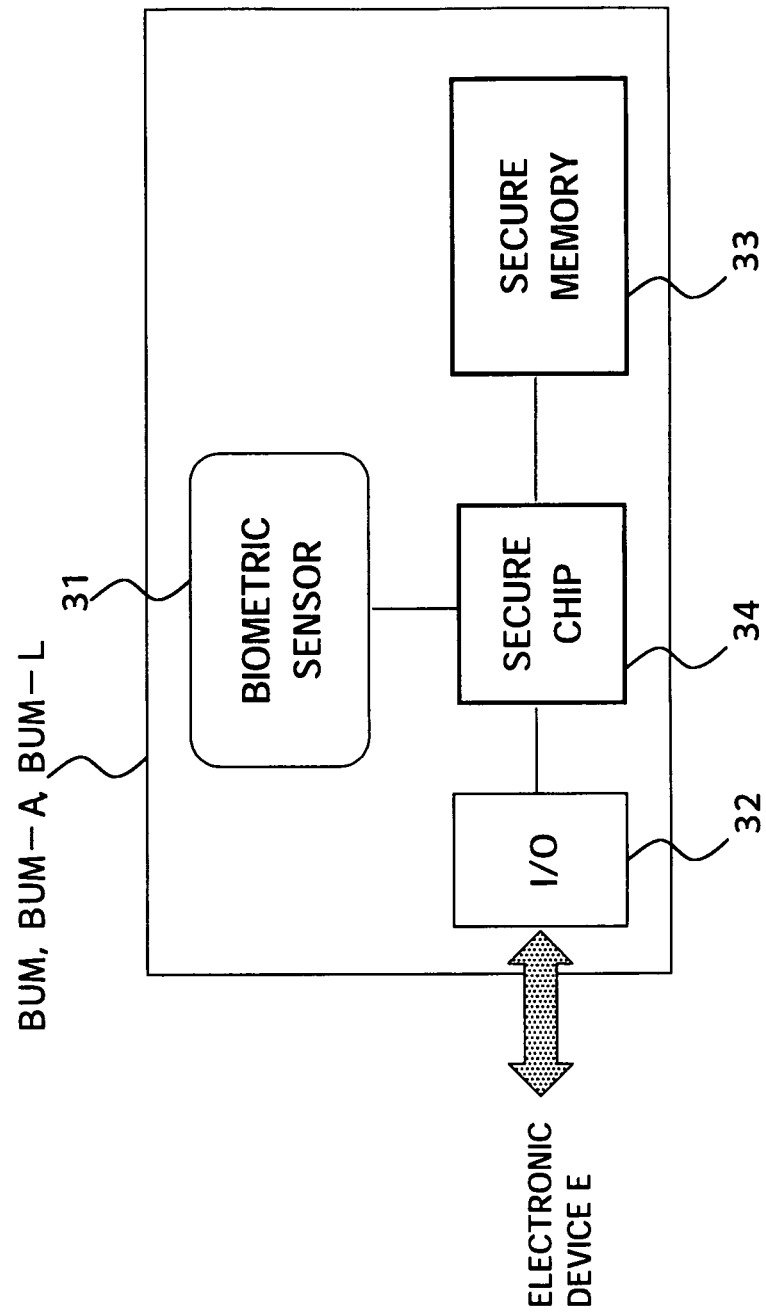
FIG. 3 is a view of the configuration of user biometric processing modules BUM, BUM-L, and BUM-A shown in FIG. 1.

FIG. 3 is a view of the configuration of the user biometric processing modules BUM, BUM-L, and BUM-A shown in FIG. 1. As shown in FIG. 3, each of the user biometric processing modules BUM, BUM-L, and BUM-A has for example a biometric sensor 31, interface 32, secure memory 33, and secure chip 34. The user biometric processing modules BUM, BUM-L, and BUM-A are portable devices installed in for example a card and a portable device.

The biometric sensor 31 detects the fingerprint, vein pattern, retinal pattern, or other biometric data of the user. The interface 32 is used for communication with the electronic device E. The interface 32 is attached at an attachment part of the electronic device E and inputs/outputs data with the electronic device E. Further, the interface 32 may perform proximity wireless communication by infrared rays with the electronic device E. The secure memory 33 is a tamperproof electronic circuit which stores the data used in the secure chip 34 in a secure state. The secure chip 34 is a tamperproof electronic circuit which performs processing concerning the user biometric authentication etc. in a secure state.

Figure 4:
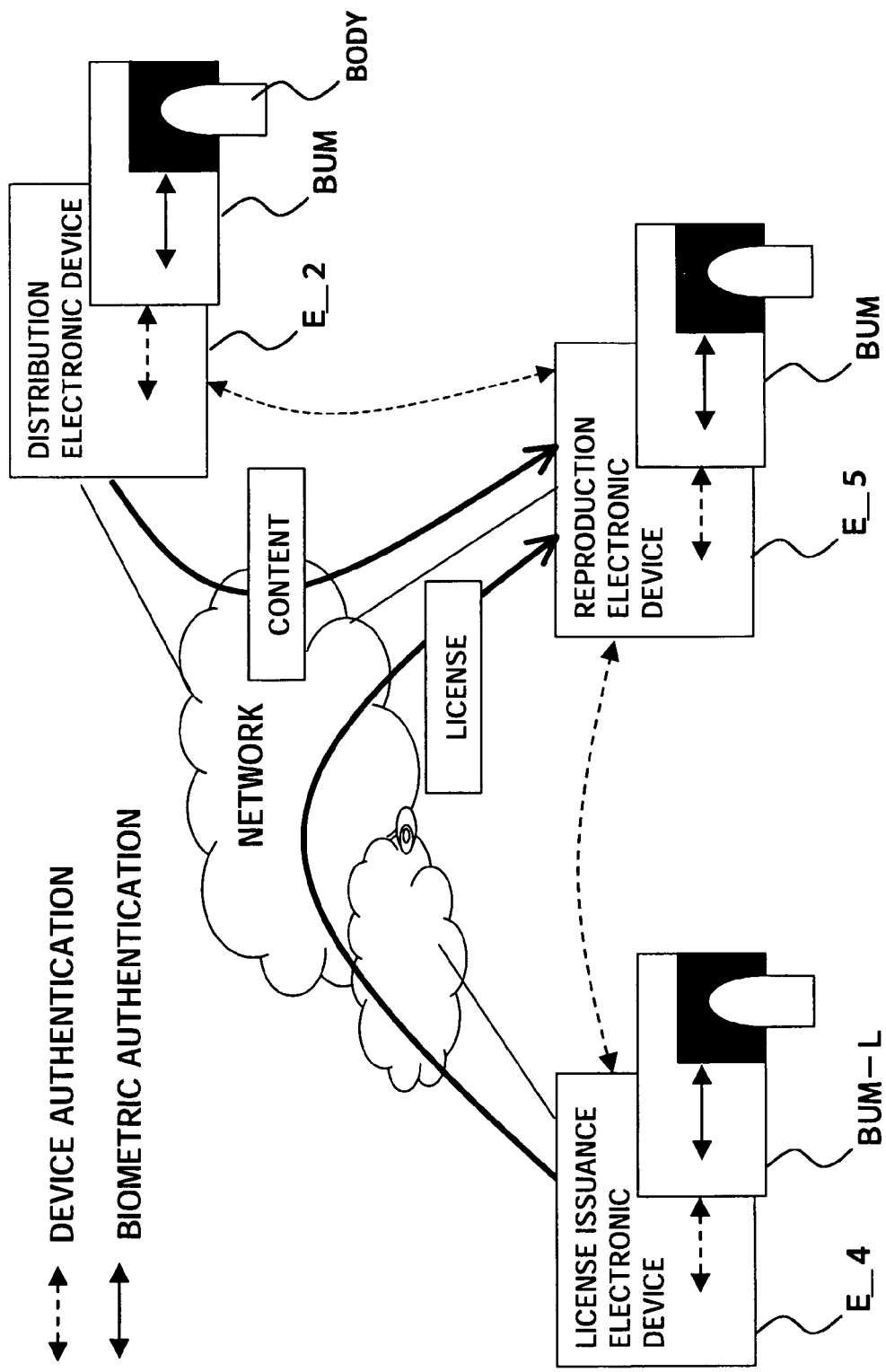
FIG. 4 is a diagram for briefly explaining an example of the operation of the data processing system shown in FIG. 1.

FIG. 4 is a diagram for briefly explaining an example of the operation of the data processing system 1. As shown in FIG. 4, in the data processing system 1, for example, the distribution electronic device E_2 and the reproduction electronic device E_5 perform device authentication between them. When the device authentication confirms legitimacy, the distribution electronic device E_2 transmits the encrypted content data CONT to the reproduction electronic device E_5. Further, the license issuance electronic device E_4 and the reproduction electronic device E_5 perform device authentication and biometric authentication between them. When these authentications confirm legitimacy, the license issuance electronic device E_4 transmits license data giving permission for use of the content data CONT to the reproduction electronic device E_5. The reproduction electronic device E_5 decrypts the encrypted content data based on the content key data included in the license data, then performs processing such as reproduction. The data processing system 1 issues each of the electronic devices E identification data D_ID, and the device public key certificate data D_PKC. The electronic devices E mutually authenticate each other by public key infrastructure PKI when communicating with each other. Further, the data processing system 1 issues each user with user identification data U_ID, user public key certificate data U_PKC, and user secret key data U_SK. These and the user identification use biometric data R_BD are stored in the secure memories 33 of the user biometric processing modules BUM, BUM-A, and BUM-L in a secure state. Further, each of the user biometric processing modules BUM, BUM-A, and BUM-L is provided with a biometric sensor 31 and compares the biometric data BD detected by the biometric sensor 31 and the identification use biometric data R_BD in the secure chip 34 in the user biometric processing module in a secure state.

Figure 5:
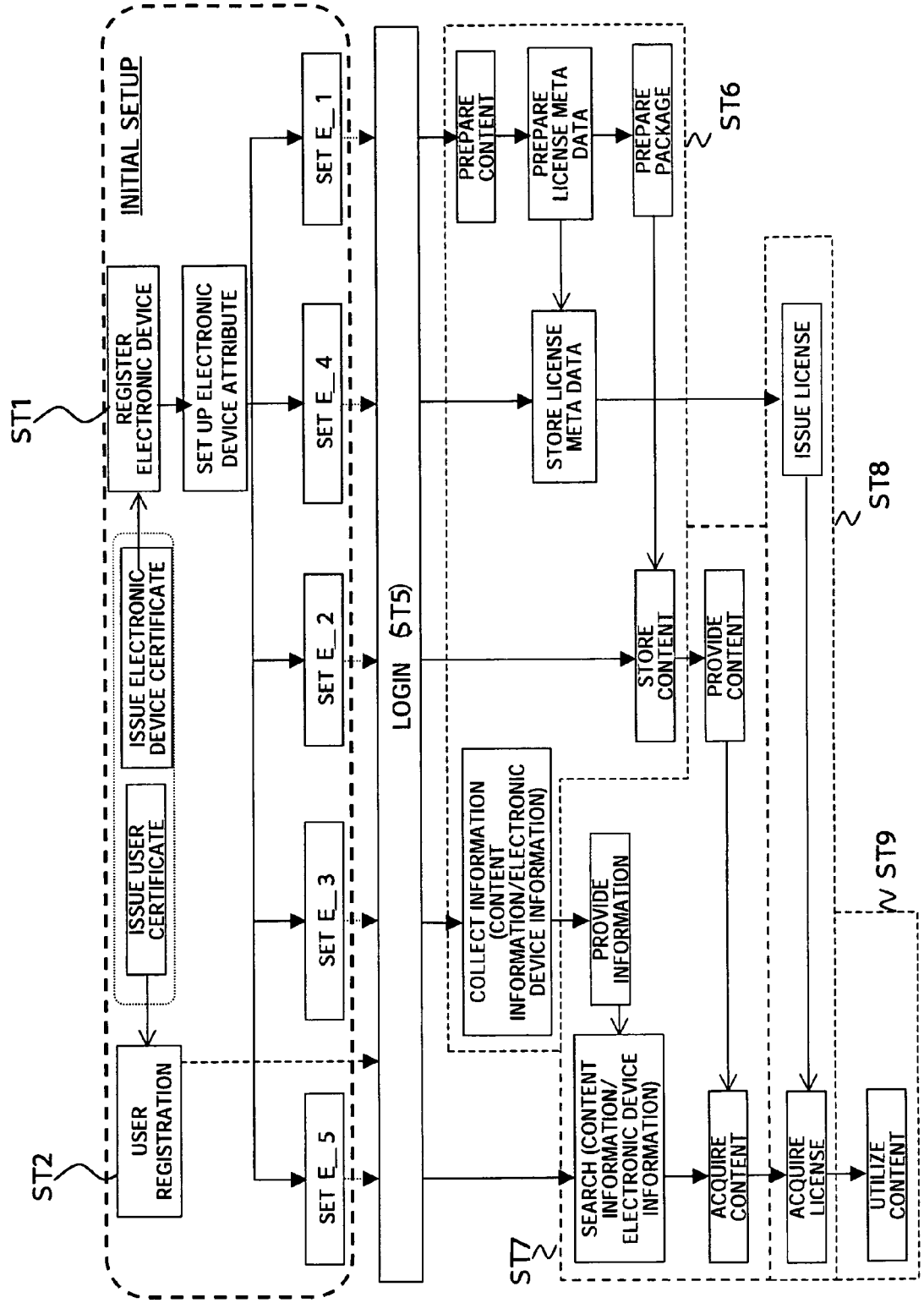
FIG. 5 is a conceptual diagram for explaining an example of the overall operation of the data processing system shown in FIG. 1.

FIG. 5 is a conceptual diagram for explaining an example of the overall operation of the data processing system 1. Below, an explanation will be given of examples of the operations shown in FIG. 5.

Electronic Device Registration Processing ST1

Figure 6:
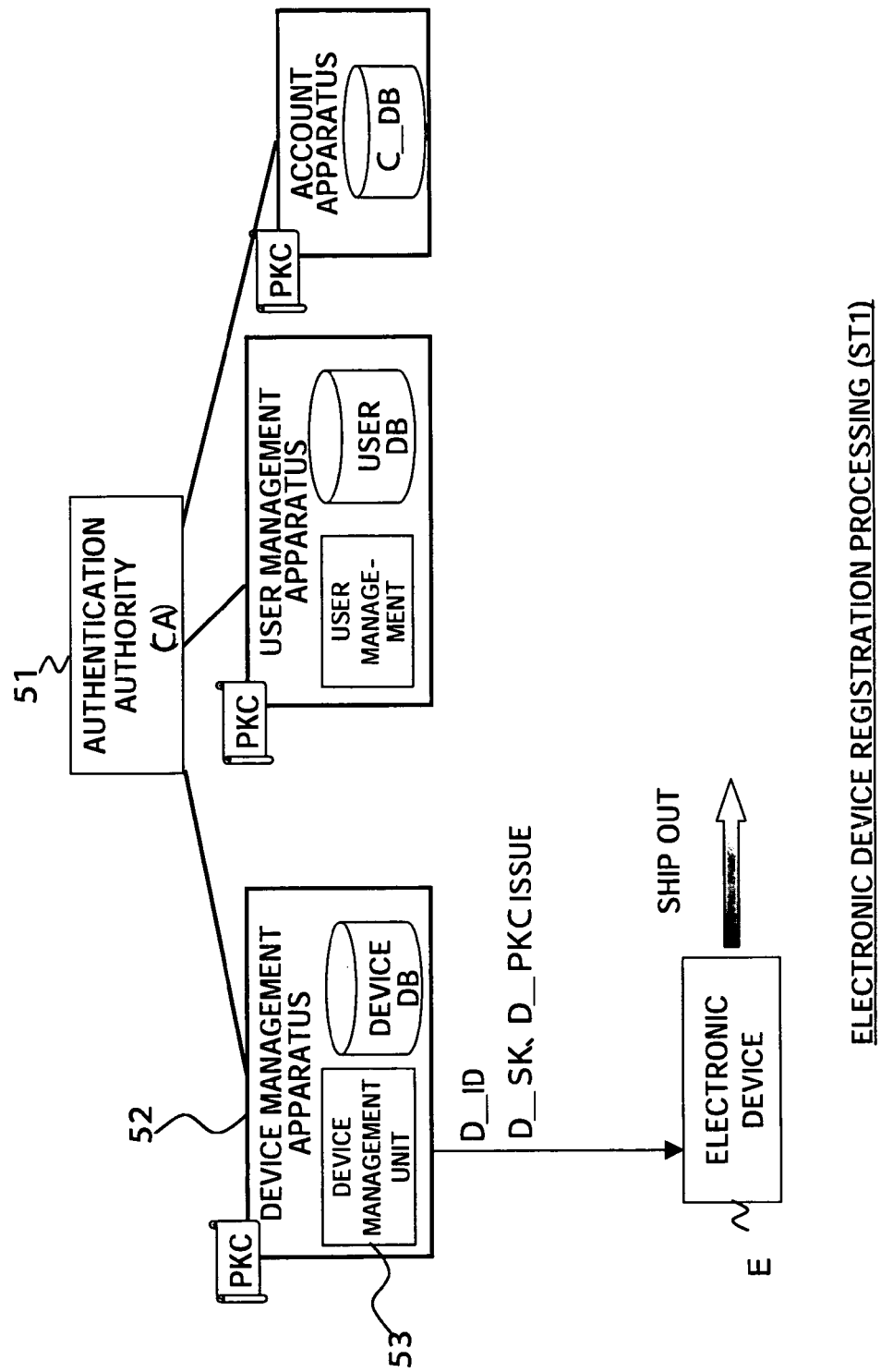
FIG. 6 is a diagram for explaining electronic device registration processing ST1 shown in FIG. 5.
Figure 7:
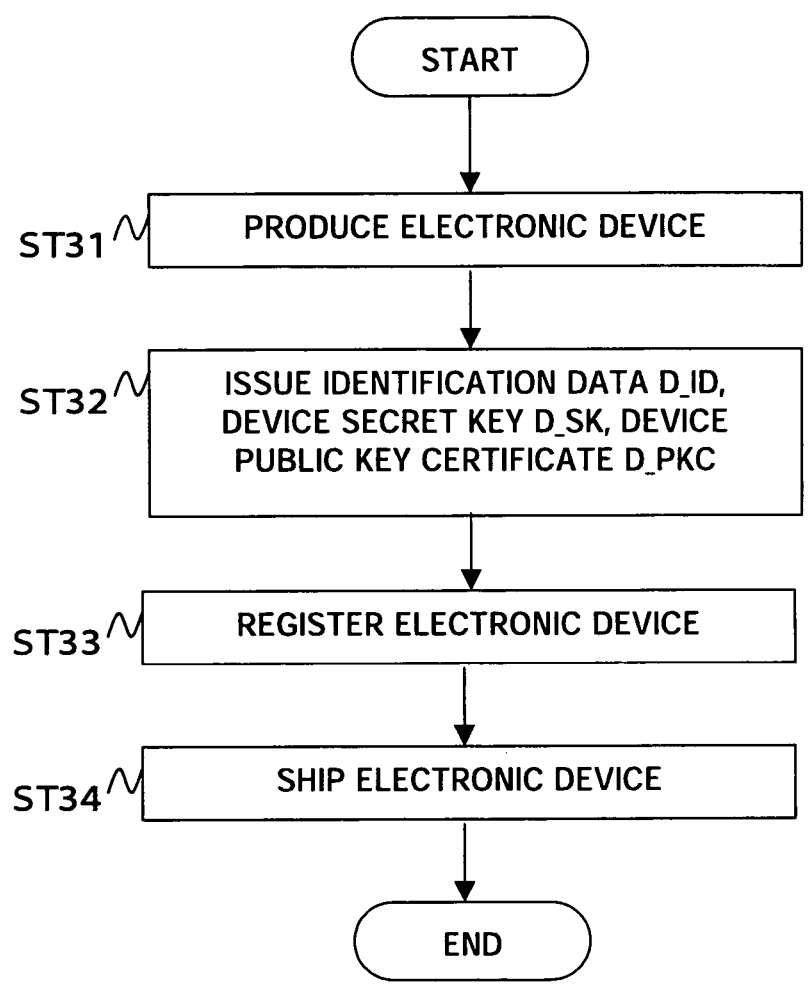
FIG. 7 is a diagram for explaining the electronic device registration processing ST1 shown in FIG. 5.

FIG. 6 and FIG. 7 are diagrams for explaining the electronic device registration processing ST1 by the data processing system 1.

Step ST31

An electronic device E (E_1 to E_5) is produced.

Step ST32

A device management apparatus 52 issues identification data D_ID of the electronic device produced at step ST31, the device secret key data D_SK, and the device public key certificate data D_PKC under the management of an authentication authority 51. Note that the device management apparatus 52 is issued a management device public key certificate PKC from the authentication authority 51 and proves the legitimacy thereof by using this certificate at the time of mutual authentication. The electronic device E receives as input the identification data D_ID, the device secret key data D_SK, and the device public key certificate data D_PKC from the device management apparatus 52 in a secure state and writes this into the secure chip 28 shown in FIG. 2.

Step ST33

The device management apparatus 52 stores (registers) the device ID of the electronic device, the device secret key data D_SK, and the device public key certificate data D_PKC issued at step ST32 linked with each other.

Step ST34

The electronic device E is shipped.

User Registration Processing ST2

Figure 8:
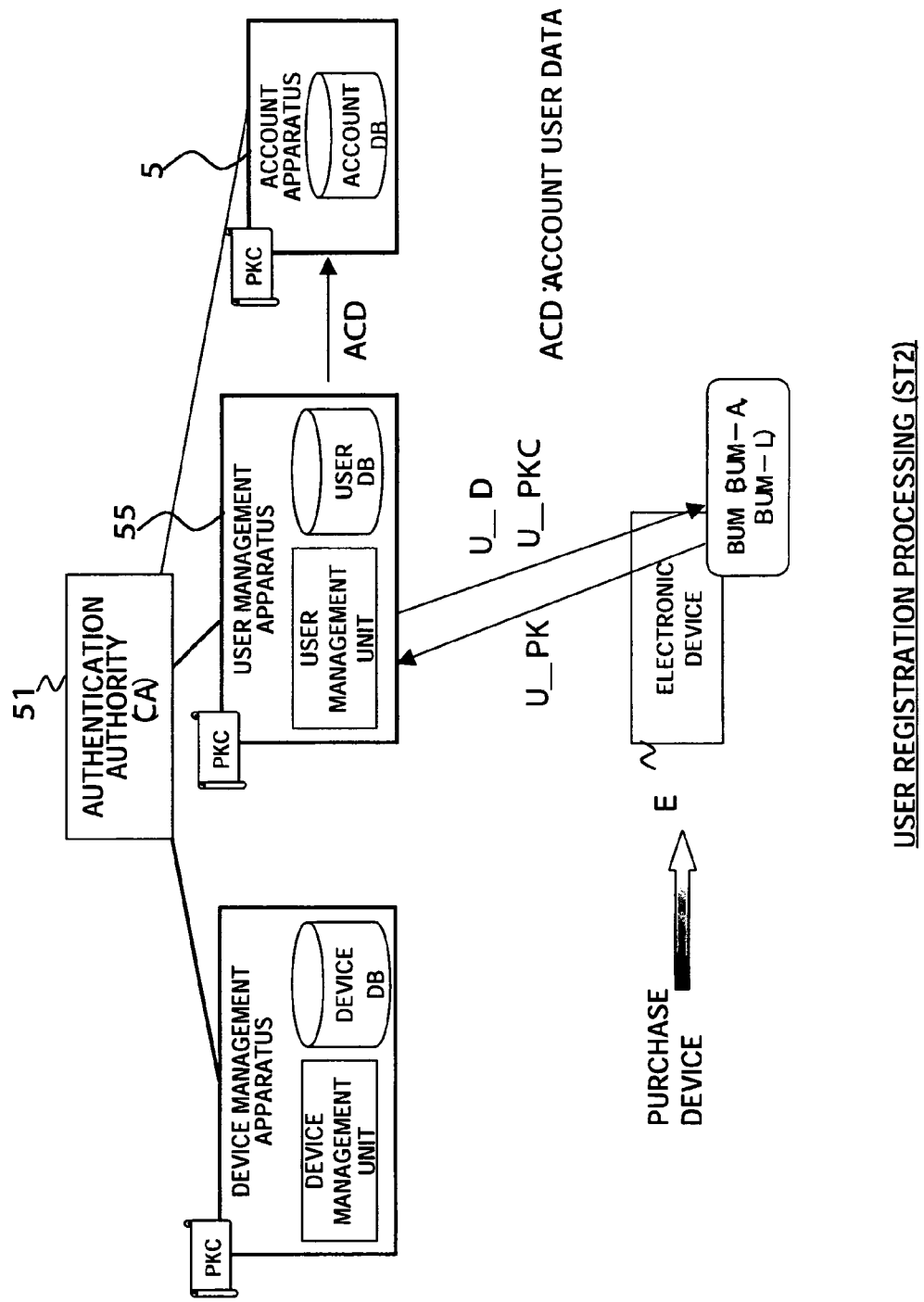
FIG. 8 is a diagram for explaining the electronic device registration processing ST2 shown in FIG. 5.
Figure 9:
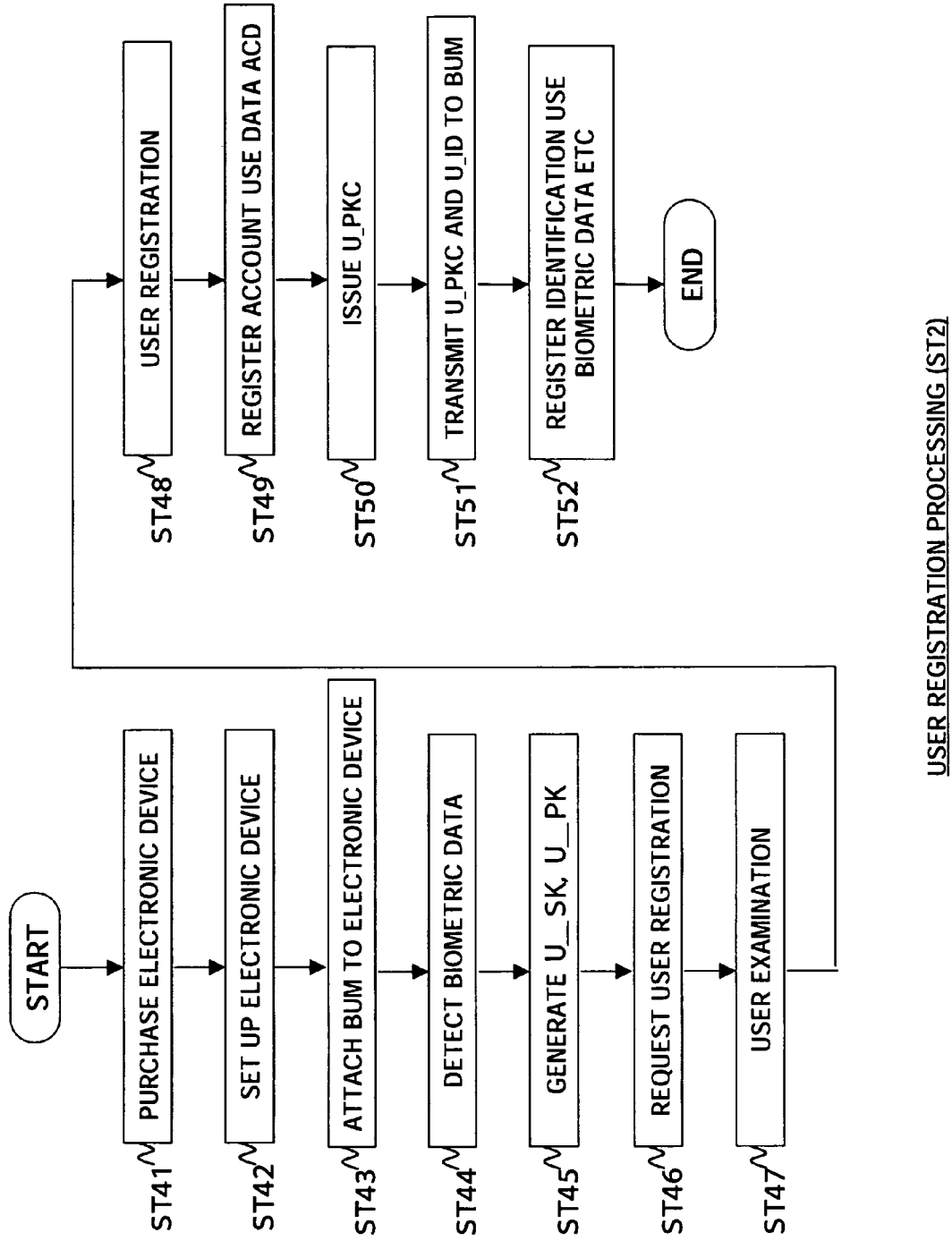
FIG. 9 is a diagram for explaining the electronic device registration processing ST2 shown in FIG. 5.

FIG. 8 and FIG. 9 are diagrams for explaining the user registration processing ST2 by the data processing system 1.

Step ST41

The user purchases the electronic device E.

Step ST42

The user sets up the electronic device E.

Step ST43

The user attaches the interface 32 of the user biometric processing module BUM shown in FIG. 3 at the BUM interface 26 of the electronic device E shown in FIG. 2.

Step ST44

The biometric sensor 31 of the user biometric processing module BUM detects the biometric data BD from a part (finger) of the user.

Step ST45

The secure chip 34 of the user biometric processing module BUM issues a request to for example a predetermined authentication authority, is issued the user secret key data U_SK and the user public key data U_PK of the user, and writes them into the secure memory 33.

Step ST46

The secure chip 34 of the user biometric processing module BUM transmits the user public key data U_PK issued at step ST45 and the user registration request including personal data of the user to the user management apparatus 55.

Step ST47

The user management apparatus 55 performs processing for examining if the user is to be registered in response to a user registration request received at step ST46. The routine proceeds to step ST48 when deciding that the user is to be registered.

Step ST48

The user management apparatus 55 registers the user and issues the user identification data U_ID.

Step ST49

The user management apparatus 55 registers account data ACD used for processing of the account of the user in the account apparatus 5. The account apparatus 5 performs the account processing based on the account data ACD of the user when receiving a coupon generation request R_Coupon from the reproduction electronic device E_5 as will be mentioned later. Note that the user management apparatus 55 and the account apparatus 5 are issued the management device public key certificate PKC from the authentication authority 51 and proves the legitimacy by using this certificate at the time of mutual authentication.

Step ST50

The user management apparatus 55 issues user public key certificate data U_PKC corresponding to the user public key data U_PK input at step ST46.

Step ST51

The user management apparatus 55 transmits the user public key certificate data U_PKC issued at step ST50 and the identification data U_ID issued at step ST48 via the electronic device E to the user biometric processing module BUM.

Step ST52

The secure chip 34 of the user biometric processing module BUM writes the characteristic data extracted from the biometric data generated at step ST44 as the identification use biometric data R_BD into the secure memory 33. Further, the secure chip 34 writes the user public key certificate data U_PKC and the identification data U_ID received at step ST51 into the secure memory 33.

Processing for Registration of Identification Use Biometric Data R_BD

Figure 10:
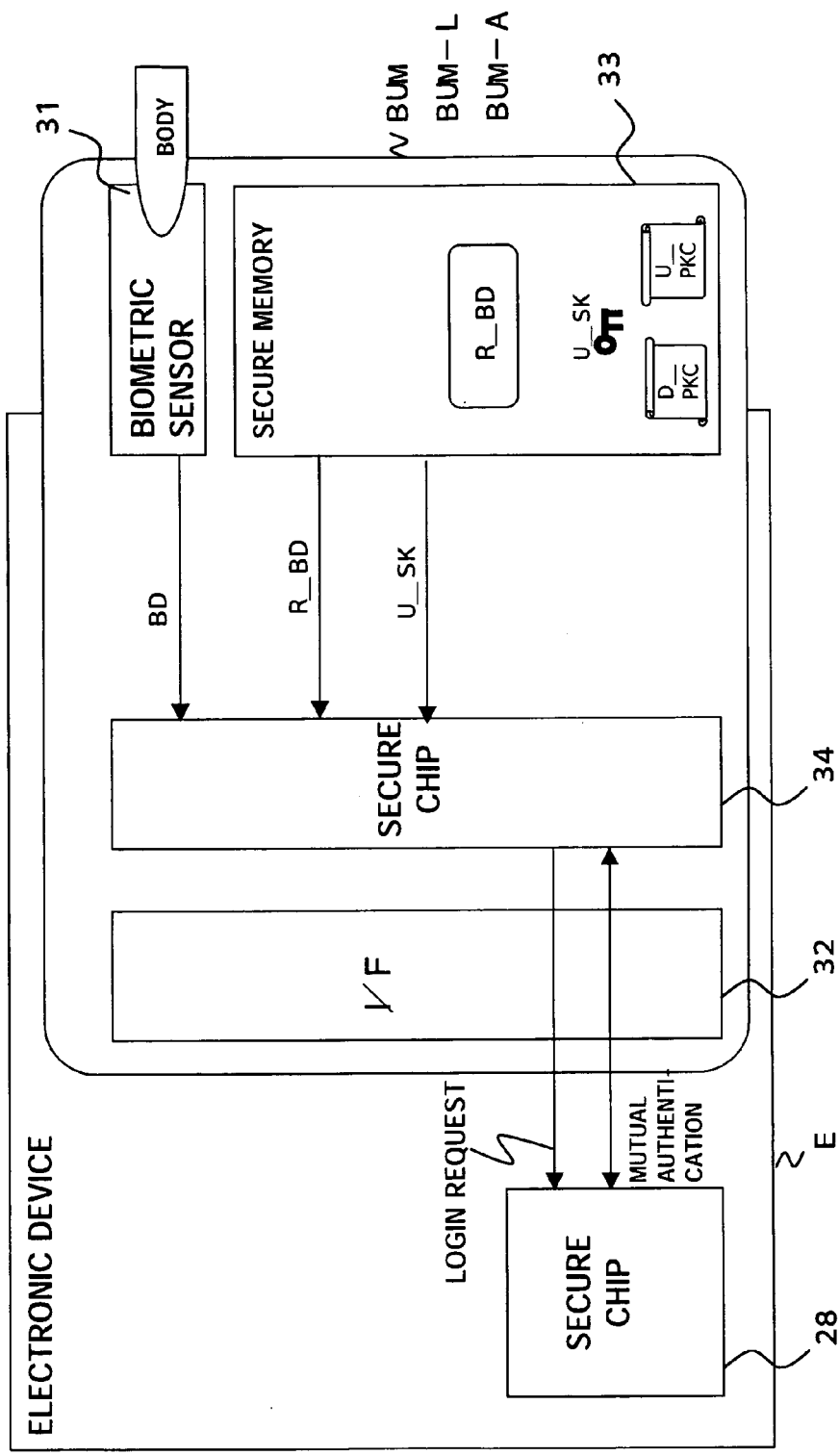
FIG. 10 is a diagram for explaining the processing for registration of identification use biometric data R_BD by the data processing system shown in FIG. 1.
Figure 11:
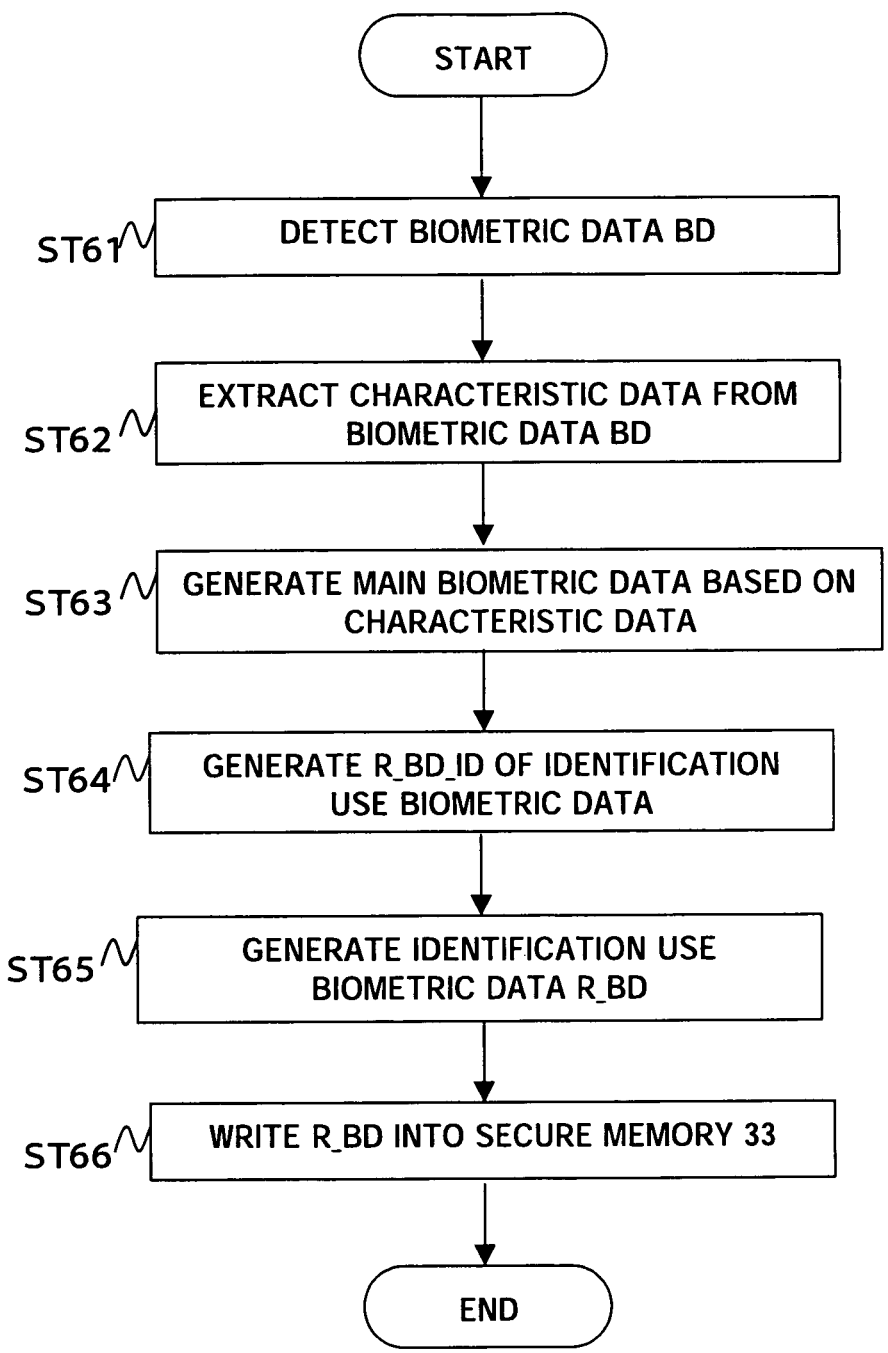
FIG. 11 is a diagram for explaining the processing for registration of identification use biometric data R_BD by the data processing system shown in FIG. 1.
Figure 12:
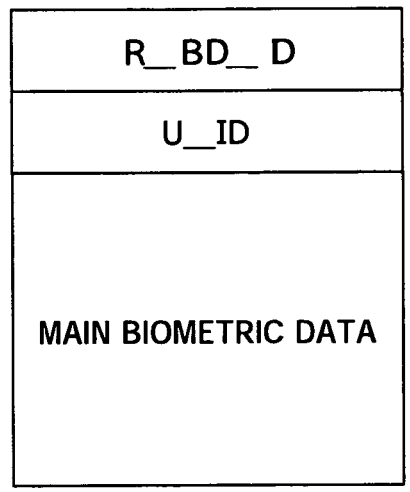
FIG. 12 is a diagram for explaining the processing for registration of identification use biometric data R_BD by the data processing system shown in FIG. 1.

Below, the processing for registering the identification use biometric data R_BD in the secure memory 33 shown in FIG. 3 according to steps ST44 and ST52 shown in FIG. 9 will be explained. FIG. 10 to FIG. 12 are diagrams for explaining the related processing. The steps shown in FIG. 11 will be explained first.

Step ST61

The biometric sensor 31 of the user biometric processing module BUM detects biometric data BD from part (finger) of the user. Step ST61 corresponds to step ST44 shown in FIG. 9.

Step ST62

The secure chip 34 extracts the characteristic data from the biometric data BD detected at step ST61. The characteristic data includes for example a fingerprint pattern, vein pattern, and voiceprint pattern inherent to the user.

Step ST63

The secure chip 34 generates main biometric data actually used for identification based on the characteristic data extracted at step ST62.

Step ST64

The secure chip 34 generates identification data R_BD_ID of the identification use biometric data R_BD. The secure chip 34 combines for example the identification data of the biometric sensor 31 and predetermined random numbers to generate the identification data R_BD_ID. Note that the secure chip 34 may also combine the identification data D_ID of the user biometric processing module BUM and predetermined random numbers to generate the identification data R_BD_ID.

Step ST65

The secure chip 34 generates the identification use biometric data R_BD including the identification data R_BD_ID generated at step ST64, the identification data U_ID of the user, and the main biometric data generated at step ST63 as shown in FIG. 12.

Step ST66

The secure chip 34 writes the identification use biometric data R_BD generated at step ST65 into the secure memory 33 shown in FIG. 3.

Login Processing ST5

Figure 13:
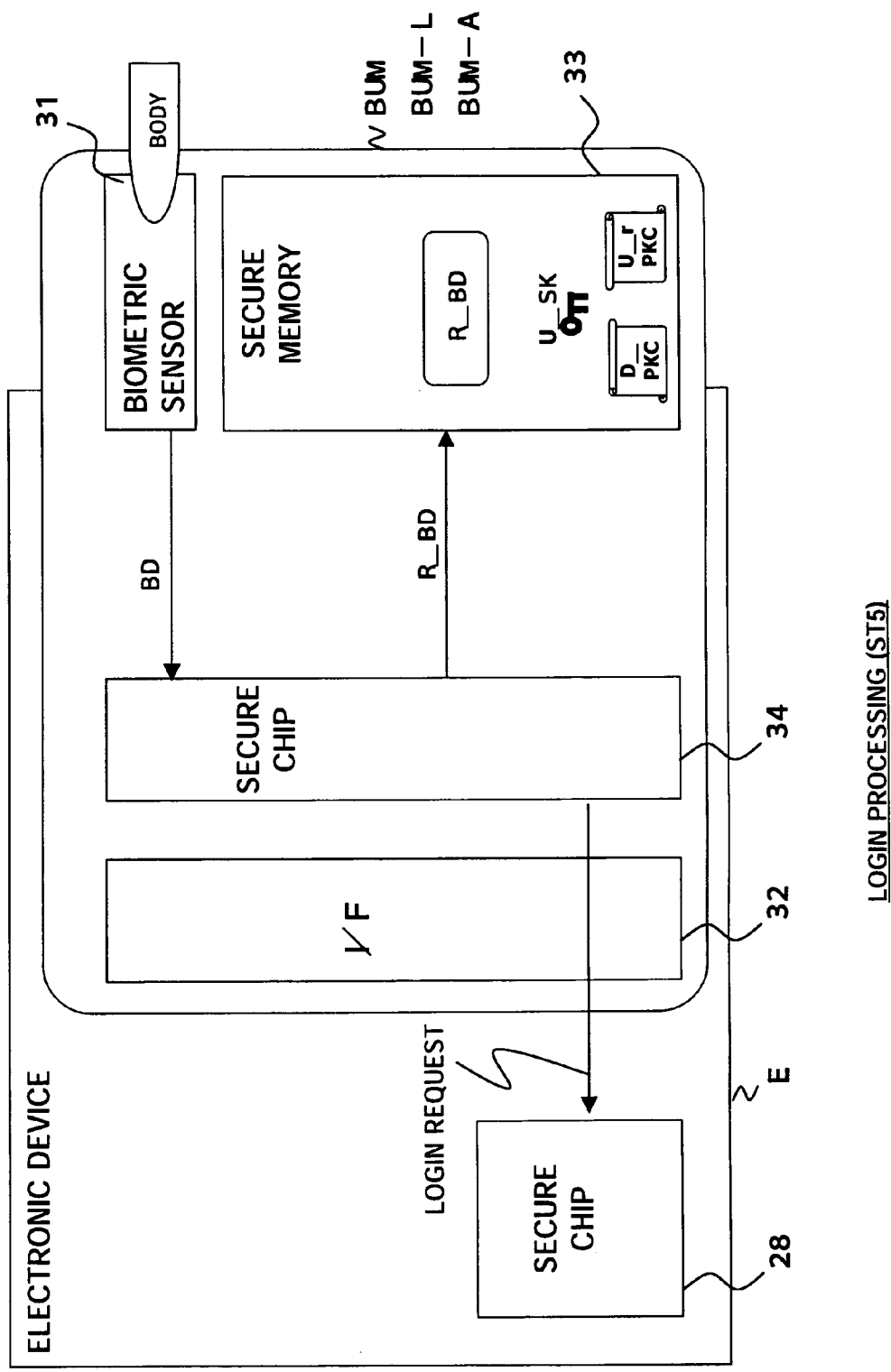
FIG. 13 is a diagram for explaining the login processing ST5 shown in FIG. 5.
Figure 14:
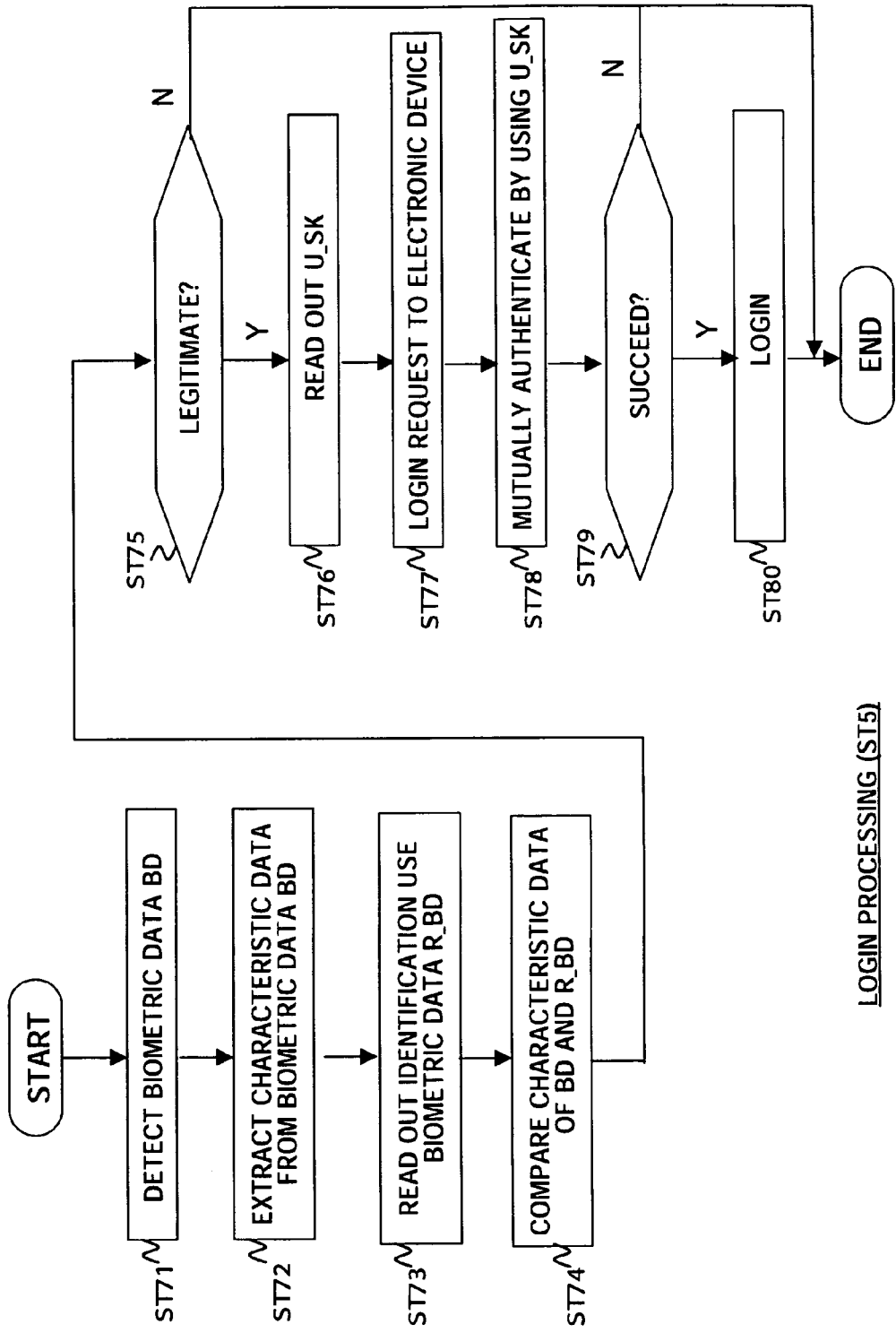
FIG. 14 is a diagram for explaining the login processing ST5 shown in FIG. 5.

FIG. 13 and FIG. 14 are flowcharts for explaining processing for logging into an electronic device E. Below, an explanation will be given of the steps shown in FIG. 14.

Step ST71

The biometric sensor 31 of the user biometric processing module BUM (BUM-A, BUM-L) detects biometric data BD from a part (finger) of the user.

Step ST72

The secure chip 34 extracts the above characteristic data from the biometric data BD detected at step ST71 and generates the characteristic data actually used for identification based on the characteristic data.

Step ST73

The secure chip 34 reads out the identification use biometric data R_BD from the secure memory 33.

Step ST74

The secure chip 34 compares the characteristic data generated at step ST72 and the main biometric data of the identification use biometric data R_BD read out at step ST73 for identification.

Step ST75

The secure chip 34 proceeds to step ST76 when judging that the biometric data BD is legitimate in the identification at step ST74, while ends the processing when not judging so (notifies refusal of login permission).

Step ST76

The secure chip 34 reads out the user secret key data U_SK (BUM) from the secure memory 33.

Step ST77

The secure chip 34 outputs a login request to the secure chip 28 of the electronic device E via the interface 32.

Step ST78

The secure chip 34 uses the user secret key data U_SK read out at step ST76 for mutual authentication with the secure chip 28 of the electronic device E.

Step ST79

The secure chip 34 proceeds to step ST80 when the mutual authentication at step ST78 confirms (succeeds in) mutual legitimacy and ends the processing when not confirming that (notifies refusal of login permission).

Step ST80

The user biometric processing module BUM logs into the electronic device E.

Content Data CONT Generation Processing (ST6)

Figure 17:
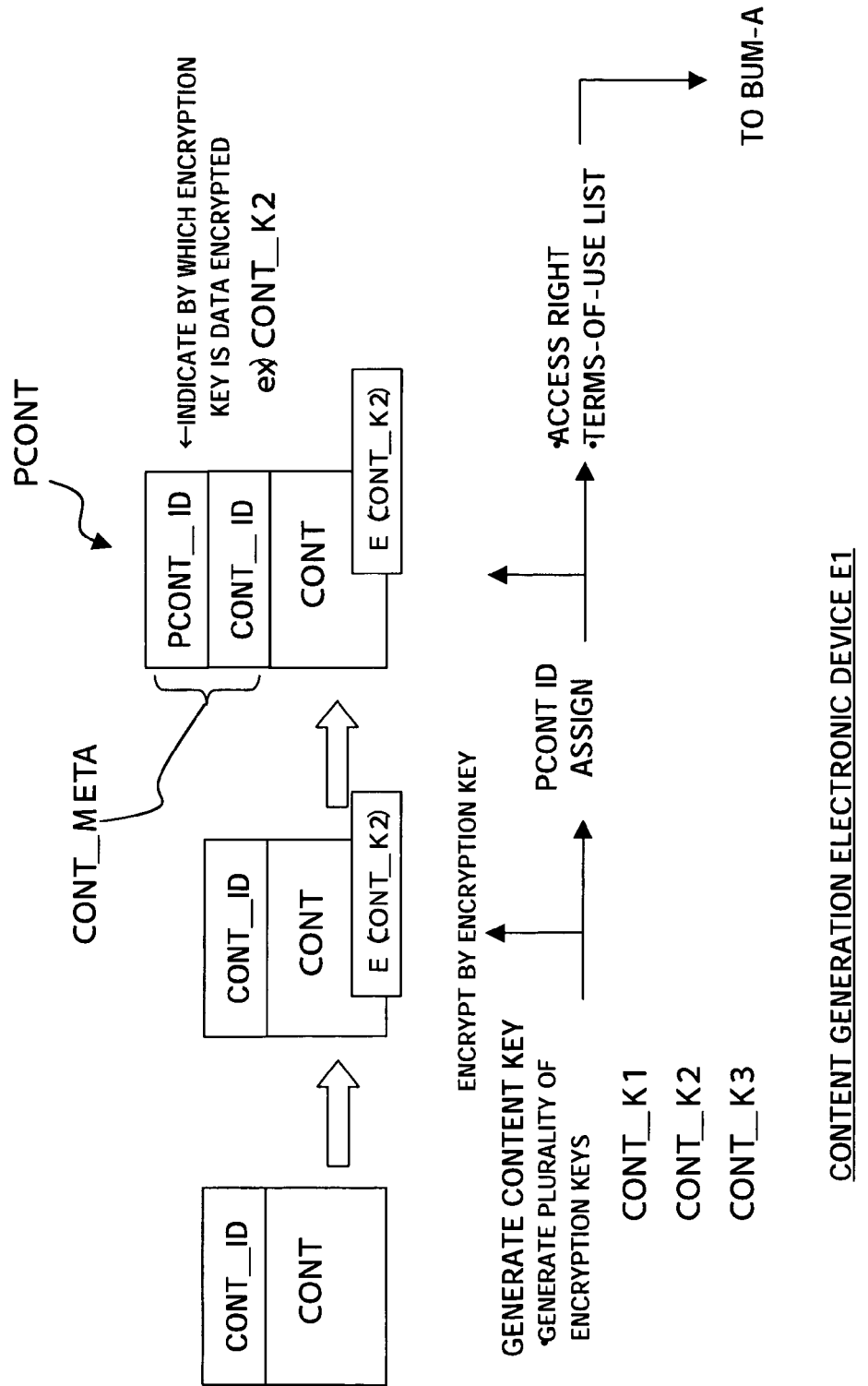
FIG. 17 is a diagram for explaining the content data CONT generation processing ST6 shown in FIG. 5.

FIG. 15 to FIG. 19 are diagrams for explaining the processing for generation of content data CONT by the data processing system 1 shown in FIG. 1. The CPU 24 of the content generation electronic device E_1 generates or acquires the content data CONT by predetermined processing. Then, the CPU 24 for example assigns identification data CONT_ID to that content data CONT. Then, as shown in FIG. 17, the secure chip 28 of the content generation electronic device E_1 selects one of a plurality of content key data CONT_K1, K2, K3 stored in the secure memory 33, for example, the content key data CONT_K2, and encrypts the content data CONT by the content key data CONT_K2. The secure chip 28 assigns the identification data PCONT_ID for identifying the above selected content key data CONT_K2 to the content data CONT. In the present embodiment, package content data PCONT is comprised of the identification data PCONT_ID, CONT_ID, and content data CONT. The content generation electronic device E_1 transmits the package content data PCONT to the distribution electronic device E_2.

Further, the CPU 24 or the secure chip 28 generates access right data of the content data CONT and terms-of-use list data. Then, the content generation electronic device E_1 outputs a license meta data generation request R_LM including the identification data PCONT_ID, the identification data CONT_ID, the content key data CONT_K2, the access right data, and the terms-of-use list data to the user biometric processing module BUM-A.

Figure 18A:
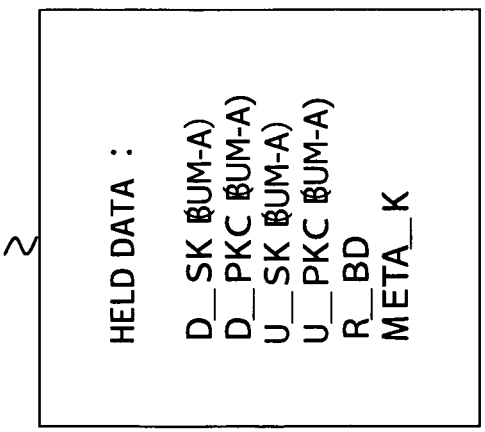
FIGS. 18A and 18B are diagrams for explaining the content data CONT generation processing ST6 shown in FIG. 5.

The secure chip 34 of the user biometric processing module BUM-A encrypts the content key data CONT_K2 by the meta data key data META_K read out from the secure memory 33 in response to the license meta data generation request R_LM. Note that the secure memory 33 of the user biometric processing module BUM-A, as shown in FIG. 18A, stores the device secret key data D_SK thereof, the device public key certificate data D_PKC, the user secret key data U_SK, the user public key certificate data U_PKC, the identification use biometric data R_BD, and the meta data key data META_K in a secure state.

Figure 18B:
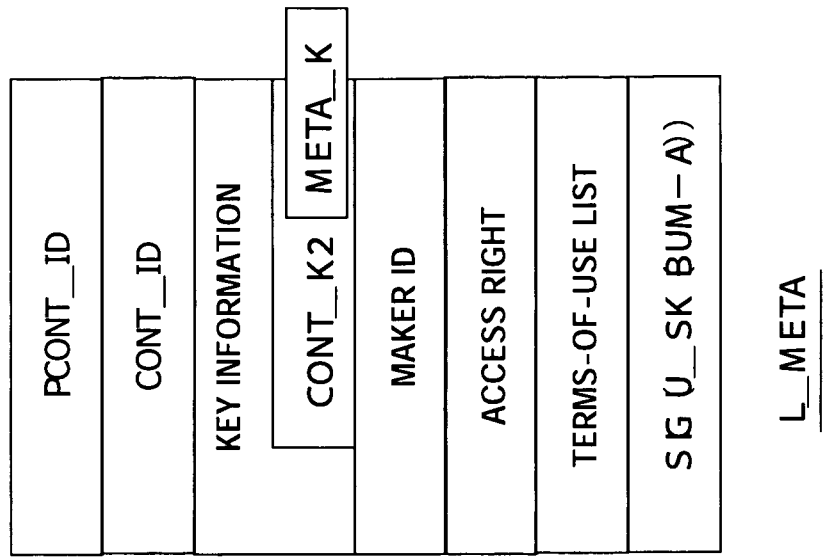

Further, the secure chip 34 generates license meta data L_META including the identification data PCONT_ID, the identification data CONT_ID, key data such as the encrypted content key data CONT_K2, maker ID, access right data, terms-of-use list data, and signature data SIG (U_SK (BUM-A)) for the data as shown in FIG. 18B. Here, the maker ID is generated by combining for example the identification data of the user public key certificate data U_PKC corresponding to the user biometric processing module BUM-A and the identification data R_BD_ID of the identification use biometric data R_BD of the user. The signature data is used for determining any tampering of the data and is generated by using the user secret key data U_SK (BUM-A) of the user biometric processing module BUM-A. Further, the secure chip 34 encrypts the meta data key data META_K read out from the secure memory 33 by the device public key data D_PK (BUM-L) of the user biometric processing module BUM-L. Then, the secure chip 34 transmits the license meta data L_META and the encrypted meta data key META_K to the license issuance electronic device E_4.

Figure 19:
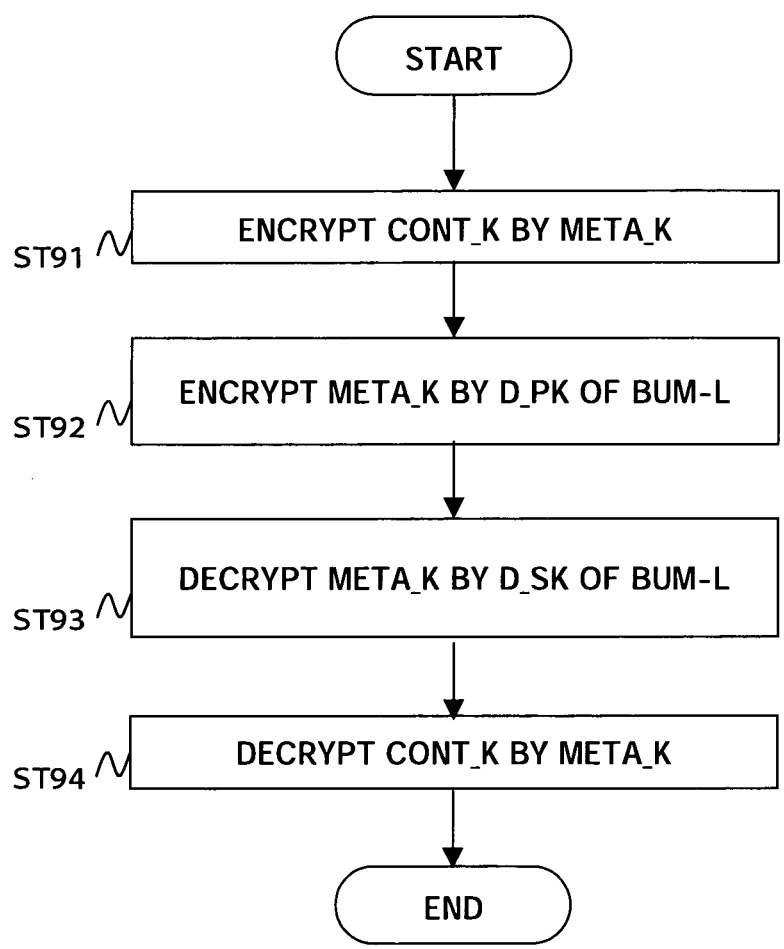
FIG. 19 is a diagram for explaining the content data CONT generation processing ST6 shown in FIG. 5.

FIG. 19 is a diagram explaining the processing for encryption of the content key data CONT_K mentioned above. Namely, the secure chip 34 of the user biometric processing module BUM-A encrypts the content key data CONT_K2 by the meta data key data META_K read out from the secure memory 33 in response to the license meta data generation request R_LM (step ST91). Then, the secure chip 34 of the user biometric processing module BUM-A encrypts the meta data key data META_K read out from the secure memory 33 by the device public key data D_PK (BUM-L) of the user biometric processing module BUM-L (step ST92). Then, the secure chip 34 of the user biometric processing module BUM-L decrypts the meta data key data META_K received from the content generation electronic device E_1 by the device secret key data D_SK read out from the secure memory 33 (step ST93). Then, the secure chip 34 of the user biometric processing module BUM-L decrypts the content key data CONT_K by using the decoded meta data key data META_K (step ST94).

Content Acquisition Processing (ST7)

Figure 20:
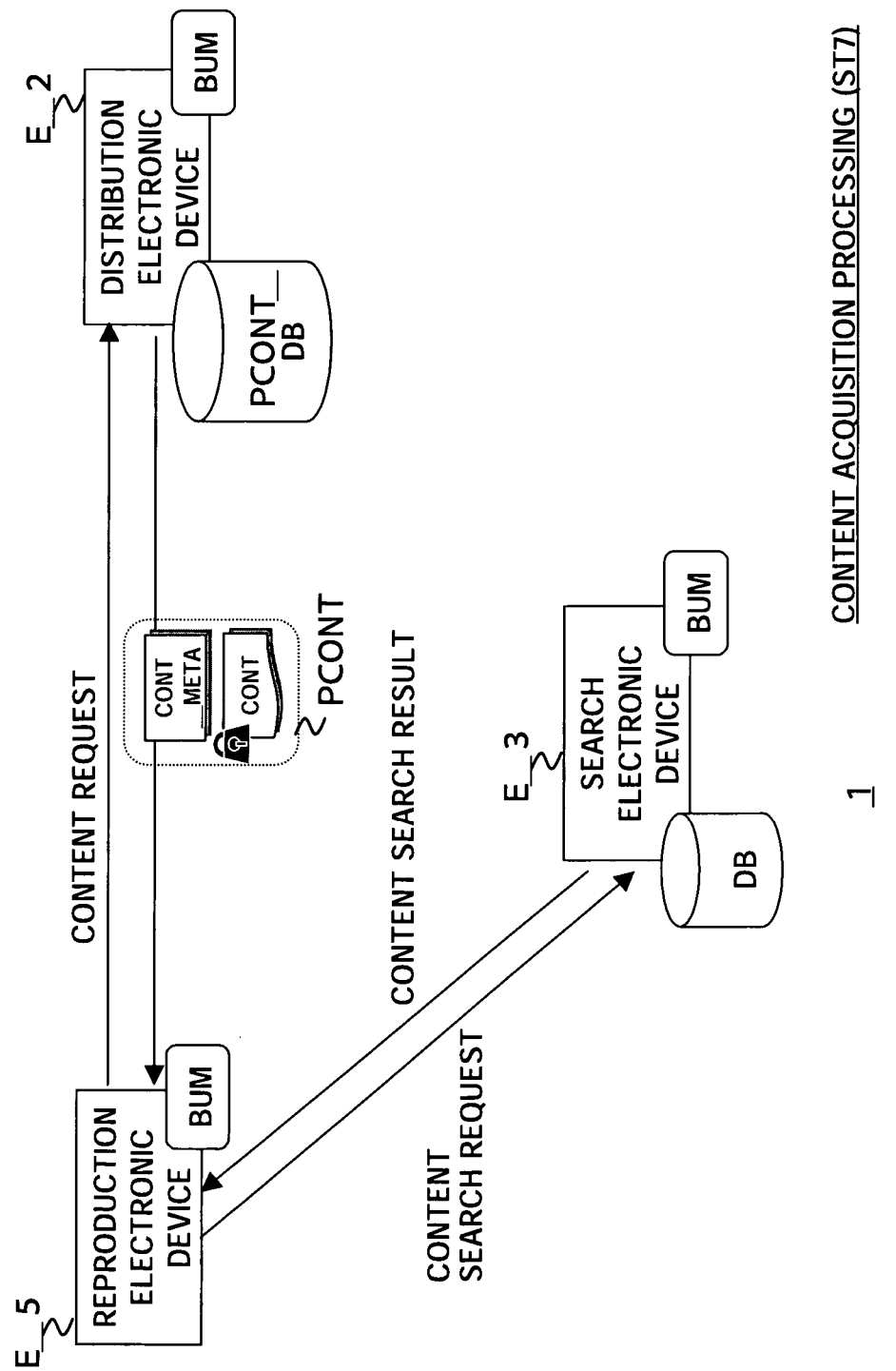
FIG. 20 is a diagram for explaining the content acquisition processing ST7 shown in FIG. 5.
Figure 21:
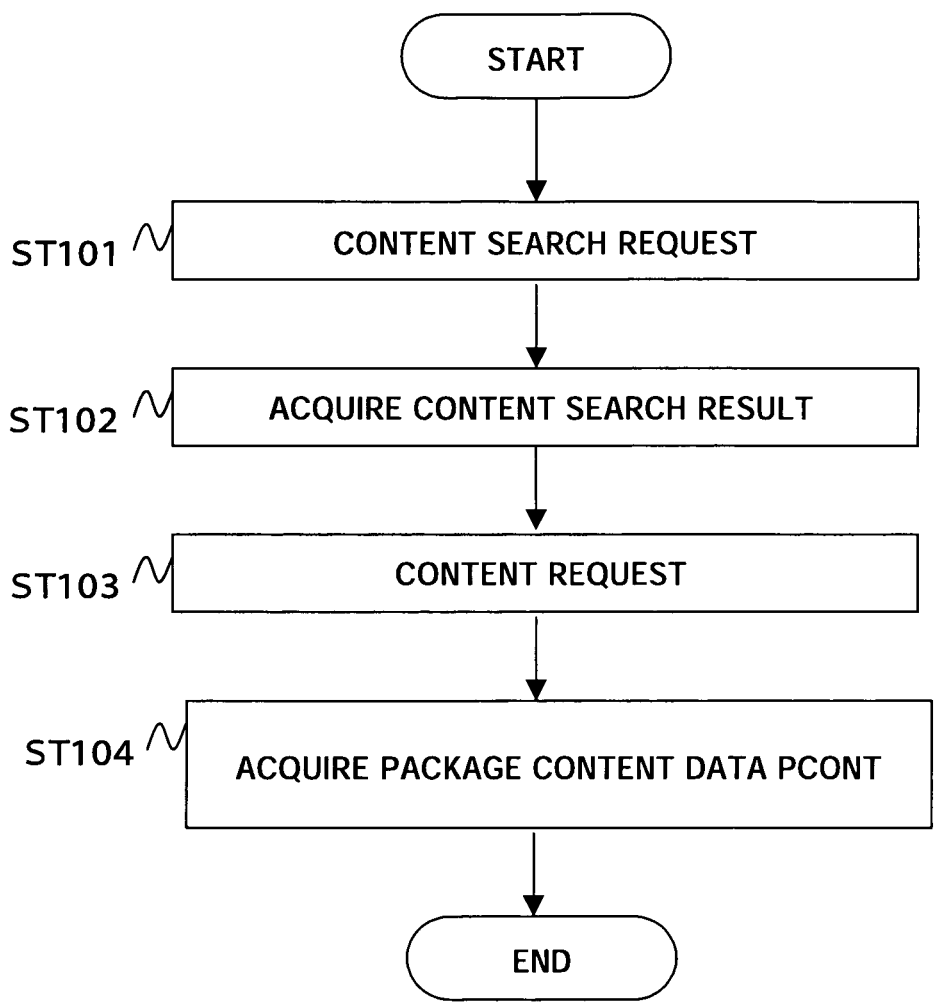
FIG. 21 is a diagram for explaining the content acquisition processing ST7 shown in FIG. 5.

FIG. 20 and FIG. 21 are diagrams for explaining the content acquisition processing. The present embodiment does not perform biometric authentication at the time of acquisition of the content data CONT since the content data CONT is encrypted.

Below, an explanation will be given according to the steps of FIG. 21.

Step ST101

The reproduction electronic device E_5 transmits a content search request designating predetermined conditions to the search electronic device E_3.

Step ST102

The search electronic device E_3 searches for the content according to the conditions designated by the content search request received at step ST101 and transmits the content search result data indicating the identification data CONT_ID thereof to the reproduction electronic device E_5.

Step ST103:

The reproduction electronic device E_5 transmits the content request designating the identification data CONT_ID indicated by the content search result data received at step ST102 to the distribution electronic device E_2.

Step ST104

The distribution electronic device E_2 transmits the package content data PCONT mentioned above by using FIG. 17 corresponding to the identification data CONT_ID designated by the content request received at step ST103 to the reproduction electronic device E_5.

License Acquisition Processing (ST8)

FIGS. 22 to 27 are diagrams for explaining the license acquisition processing. Below, an explanation will be given according to the steps shown in FIG. 23.

Step ST111

Figure 22:
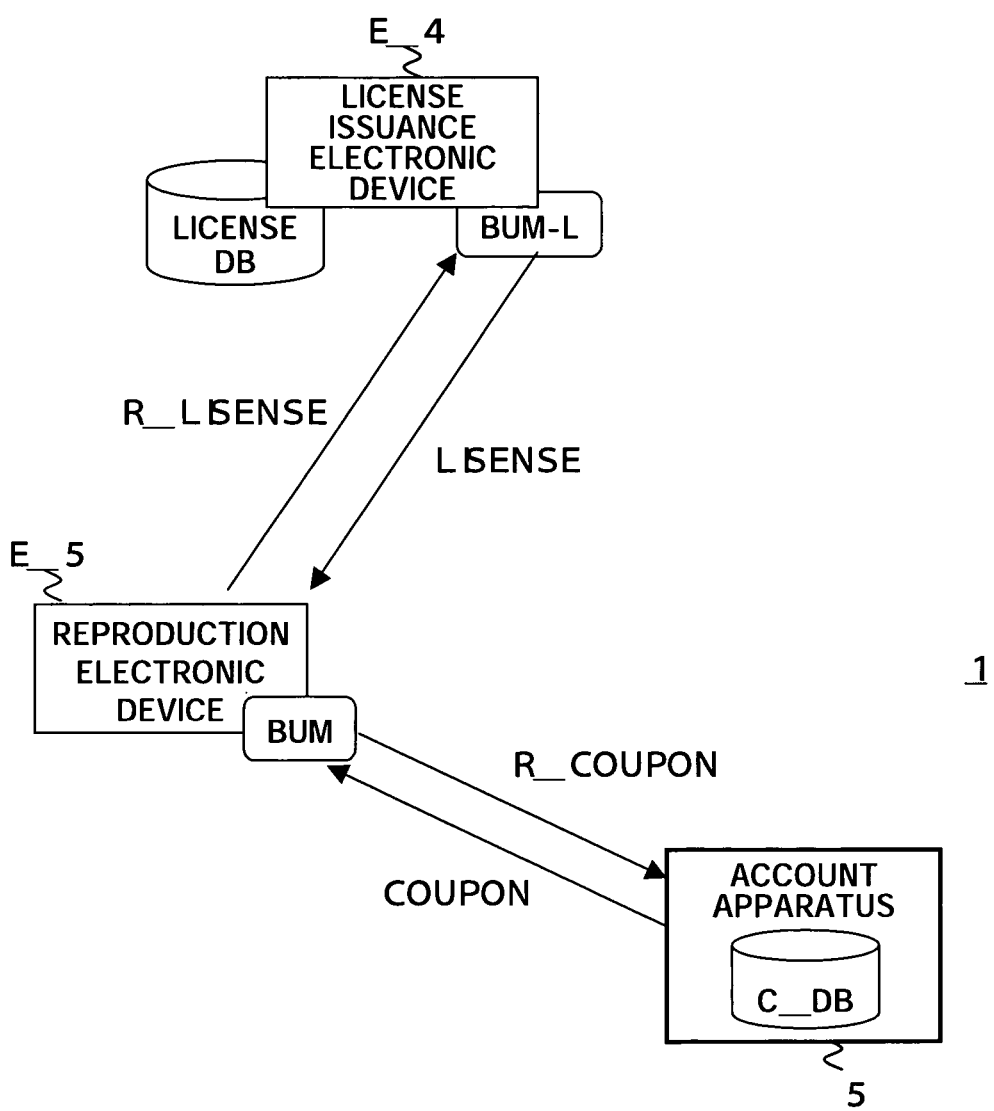
FIG. 22 is a diagram for explaining the license acquisition processing ST8 shown in FIG. 5.
Figure 23:
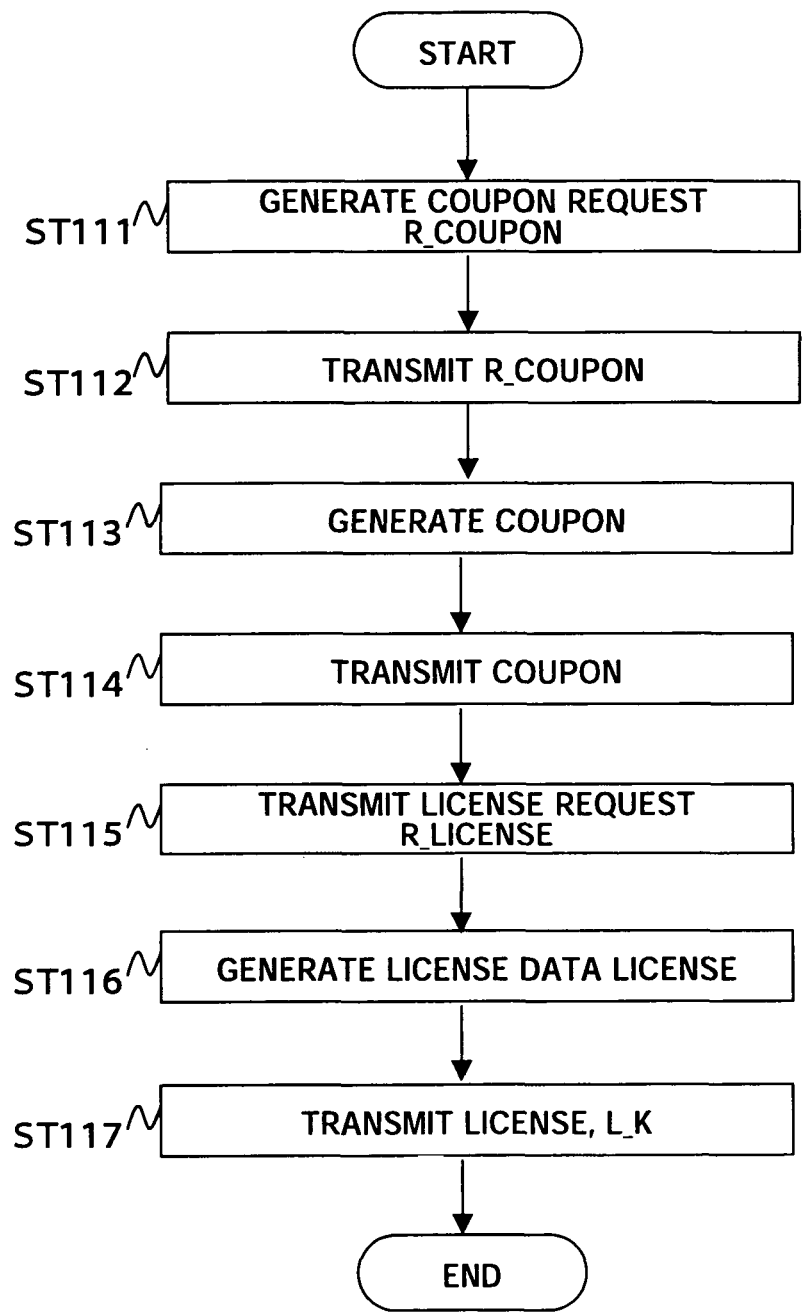
FIG. 23 is a diagram for explaining the license acquisition processing ST8 shown in FIG. 5.
Figure 24:
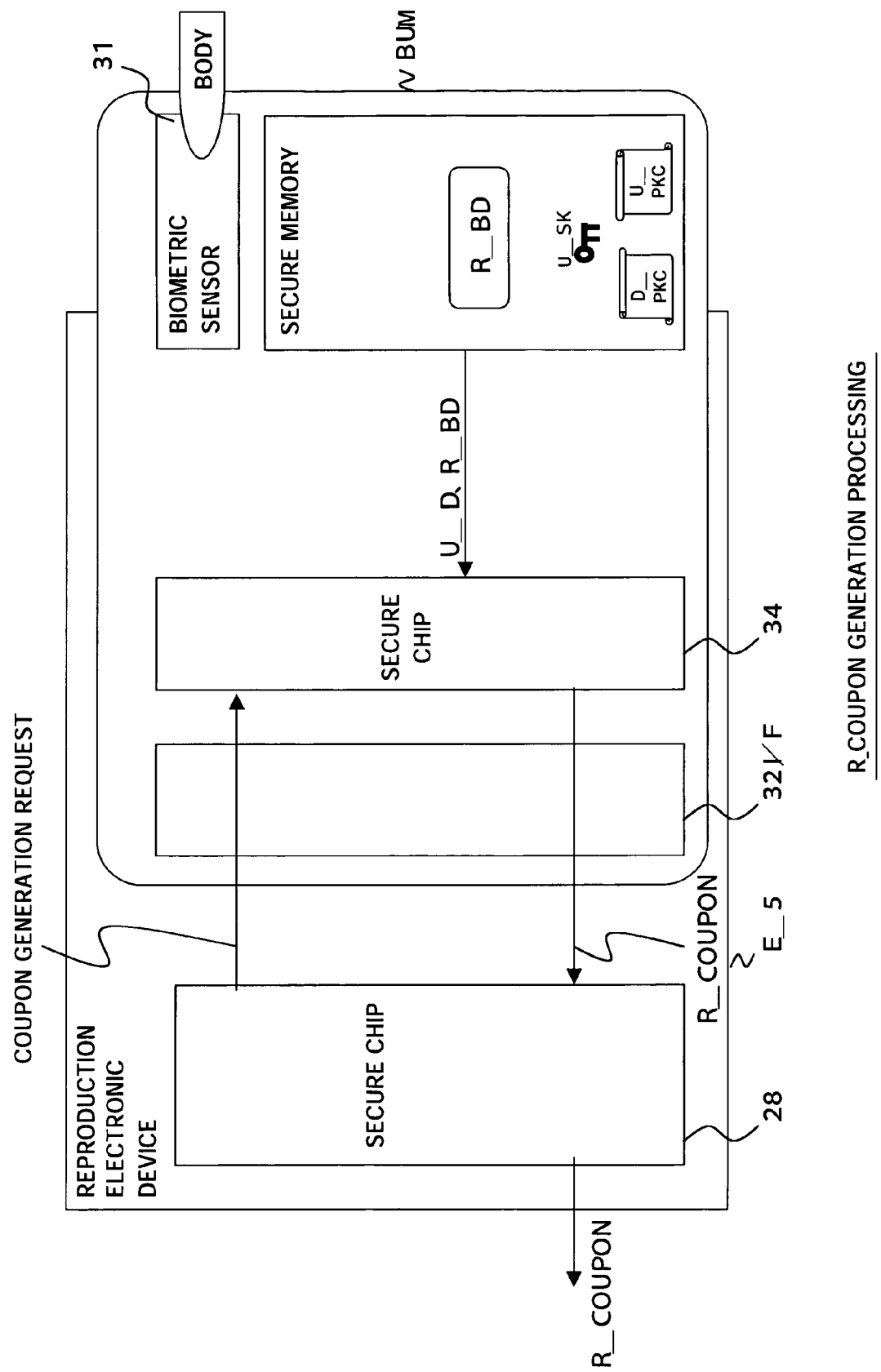
FIG. 24 is a diagram for explaining the license acquisition processing ST8 shown in FIG. 5.
Figure 25:
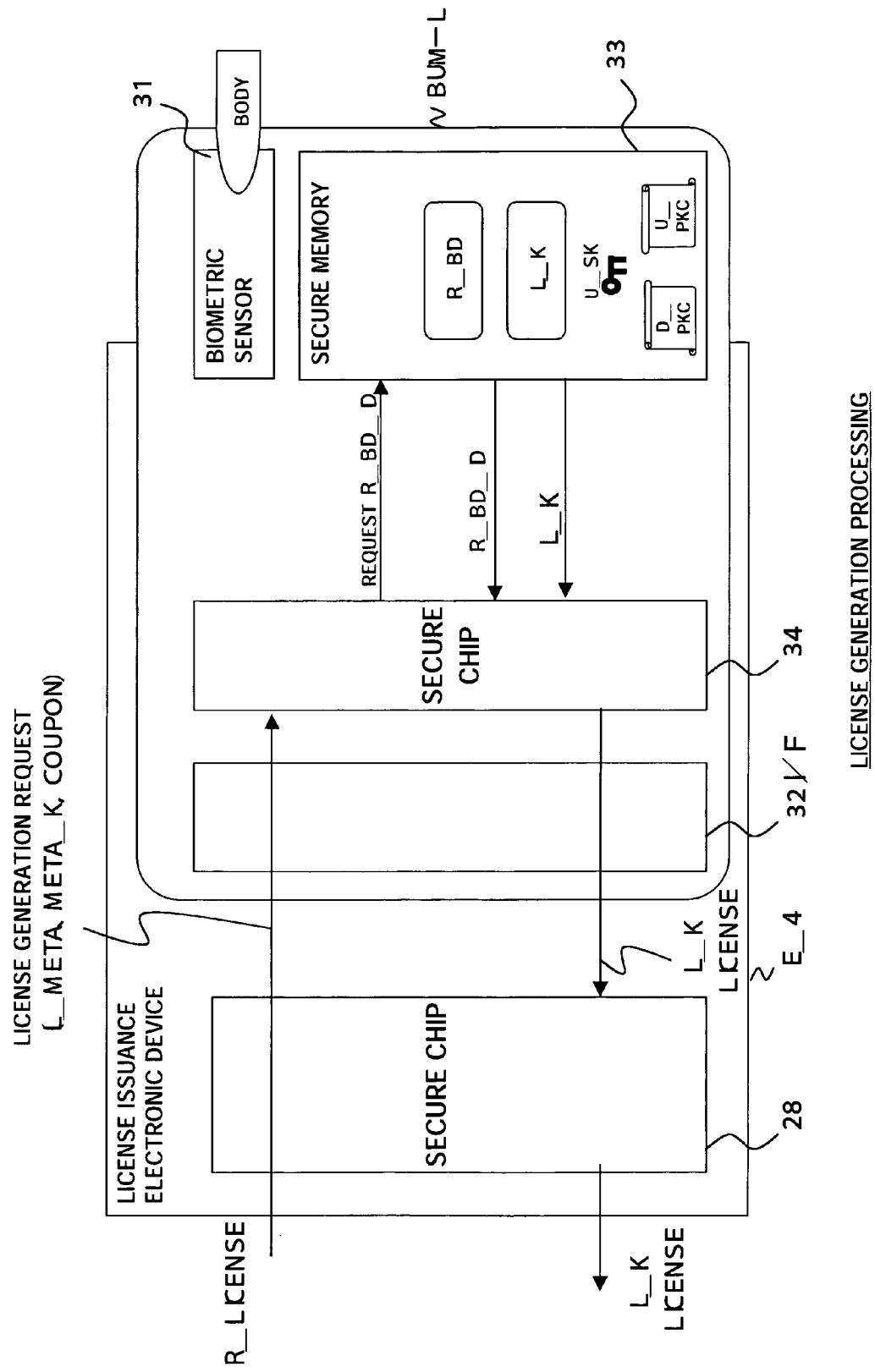
FIG. 25 is a diagram for explaining the license acquisition processing ST8 shown in FIG. 5.

The reproduction electronic device E_5 generates the coupon request R_Coupon and transmits this to the account apparatus 5 as shown in FIG. 22. As shown in FIG. 24, the secure chip 28 of the reproduction electronic device E_5 outputs the coupon generation request to the user biometric processing module BUM in accordance with the operation of the user. The coupon generation request indicates the identification data PCONT_ID of the package content data PCONT to be licensed to the user and the desired terms of use thereof. The secure chip 34 of the user biometric processing module BUM reads out the identification data U_ID and the identification use biometric data R_BD of the user from the secure memory 33 when a coupon generation request is input. The secure chip 34 generates hash data of the identification use biometric data R_BD to generate H(T). The secure chip 34 generates the coupon generation request R_Coupon including the identification data PCONT_ID, U_ID, desired terms-of-use data, and the hash data H(T) as shown in FIG. 26(A) and outputs this via the interface 32 to the secure chip 28 of the reproduction electronic device E_5. The coupon generation request R_Coupon is given the signature data using the user secret key data U_SK of the user of the user biometric processing module BUM.

Step ST112

The reproduction electronic device E_5 transmits the coupon generation request R_Coupon shown in FIG. 26(A) generated at step ST111 to the account apparatus 5.

Step ST113

The account apparatus 5 performs the account processing for issuing the license concerning the designated content data when acquiring the coupon generation request R_Coupon at step ST112 and generates the coupon data Coupon shown in FIG. 26(B). As shown in FIG. 26(B), the coupon data Coupon includes the identification data Coupon_ID of the coupon data Coupon, the identification data PCONT_ID, the identification data ID of the account apparatus 5, the identification data U_ID of the licensed person, the terms of use data, the hash data H(T), and the received sum data. Among them, as the identification data PCONT_ID, the identification data U_ID, and the hash data H(T), use is made of those in the coupon generation request R_Coupon received at step ST112. Further, the coupon data Coupon has added to it the signature data using the secret key data 5_Sk of the account apparatus 5.

Step ST114

The account apparatus 5 transmits the coupon data Coupon generated at step ST113 to the reproduction electronic device E_5.

Step ST115

The reproduction electronic device E_5 transmits the license request R_Licence including the coupon data Coupon received at step ST114 to the license issuance electronic device E_4.

Step ST116

Figure 15:
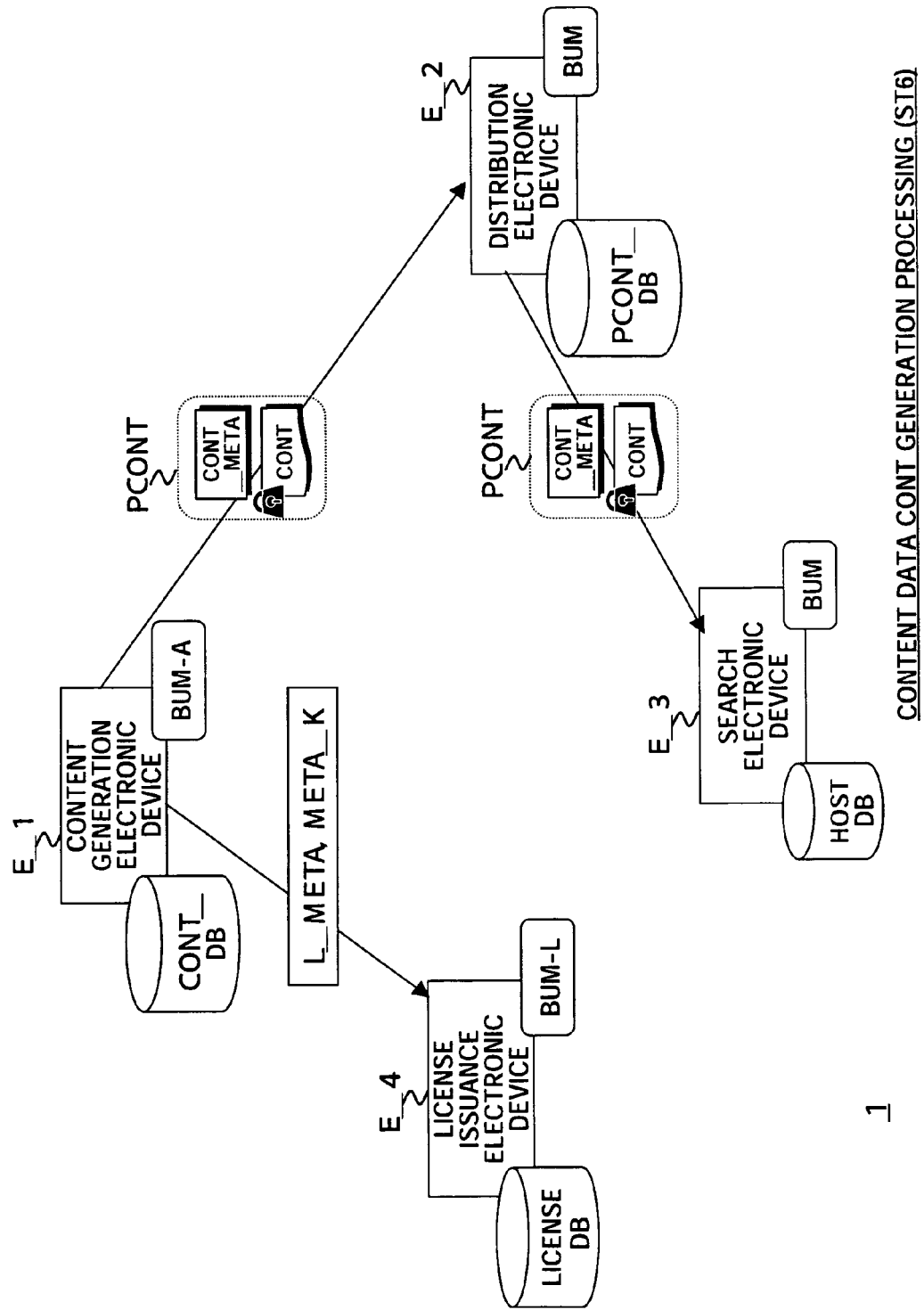
FIG. 15 is a diagram for explaining the content data CONT generation processing ST6 shown in FIG. 5.
Figure 16:
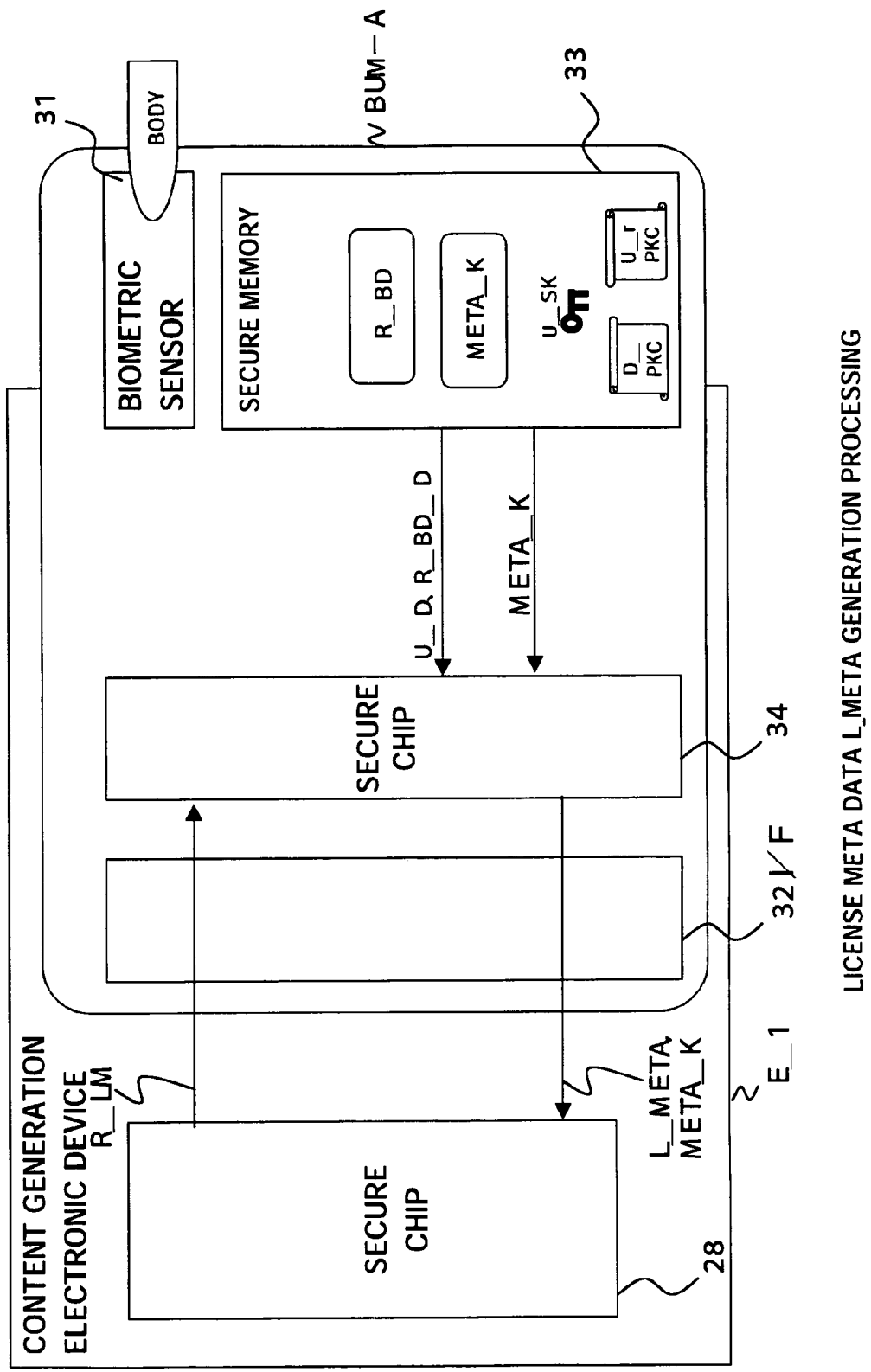
FIG. 16 is a diagram for explaining the content data CONT generation processing ST6 shown in FIG. 5.
Figure 27:
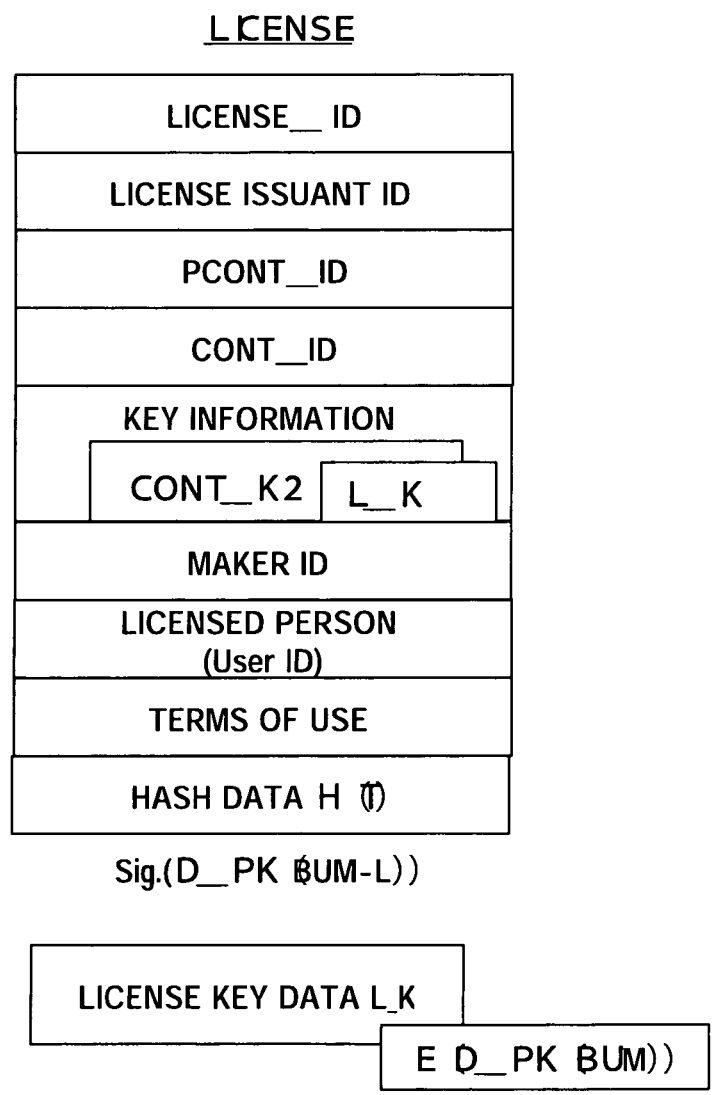
FIG. 27 is a diagram for explaining the license acquisition processing ST8 shown in FIG. 5.

The secure chip 34 of the user biometric processing module BUM-L attached to the license issuance electronic device E_4 generates the license data License shown in FIG. 27 based on the license meta data L_META and the encrypted meta data key data META_K input from the content generation electronic device E_1 and the coupon data Coupon received at step ST15 as explained by using FIG. 15 etc. As shown in FIG. 27, the license data License includes the license identification data License_ID, license issuant ID, identification data PCONT_ID, CONT_ID, the key information including the encrypted content key data CONT_K2, the maker ID, the identification data U_ID of the licensed person, terms of use, and hash data H(T). Here, the license issuant ID indicates the ID of the license issuance electronic device E_4. The identification data PCONT_ID, CONT_ID, the identification data U_ID of the licensed person, the terms of use, and the hash data H(T) are prescribed based on the coupon data Coupon. The secure chip 34 of the user biometric processing module BUM-L decrypts the input encrypted meta data key data META_K by using the device secret key data D_SK thereof and decrypts the content key data CONT_K2 in the license meta data L_META by using the decoded meta data key data META_K. Thereafter, the secure chip 34 encrypts the content key data CONT_K2 by the license key data L_K read out from the secure memory 33. Further, the secure chip 34 encrypts the license key data L_K by the device public key data D_PK of the user biometric processing module BUM attached to the reproduction electronic device E_5.

Step ST117

The user biometric processing module BUM-L transmits the license data License generated at step ST116 and the encrypted license key data L_K via the license issuance electronic device E_4 to the reproduction electronic device E_5. The license data License and the license key data L_K are output via the reproduction electronic device E_5 to the user biometric processing module BUM attached to device E_5 and written into the secure memory 33 thereof.

Content Utilization Processing (ST9)

Figure 28:
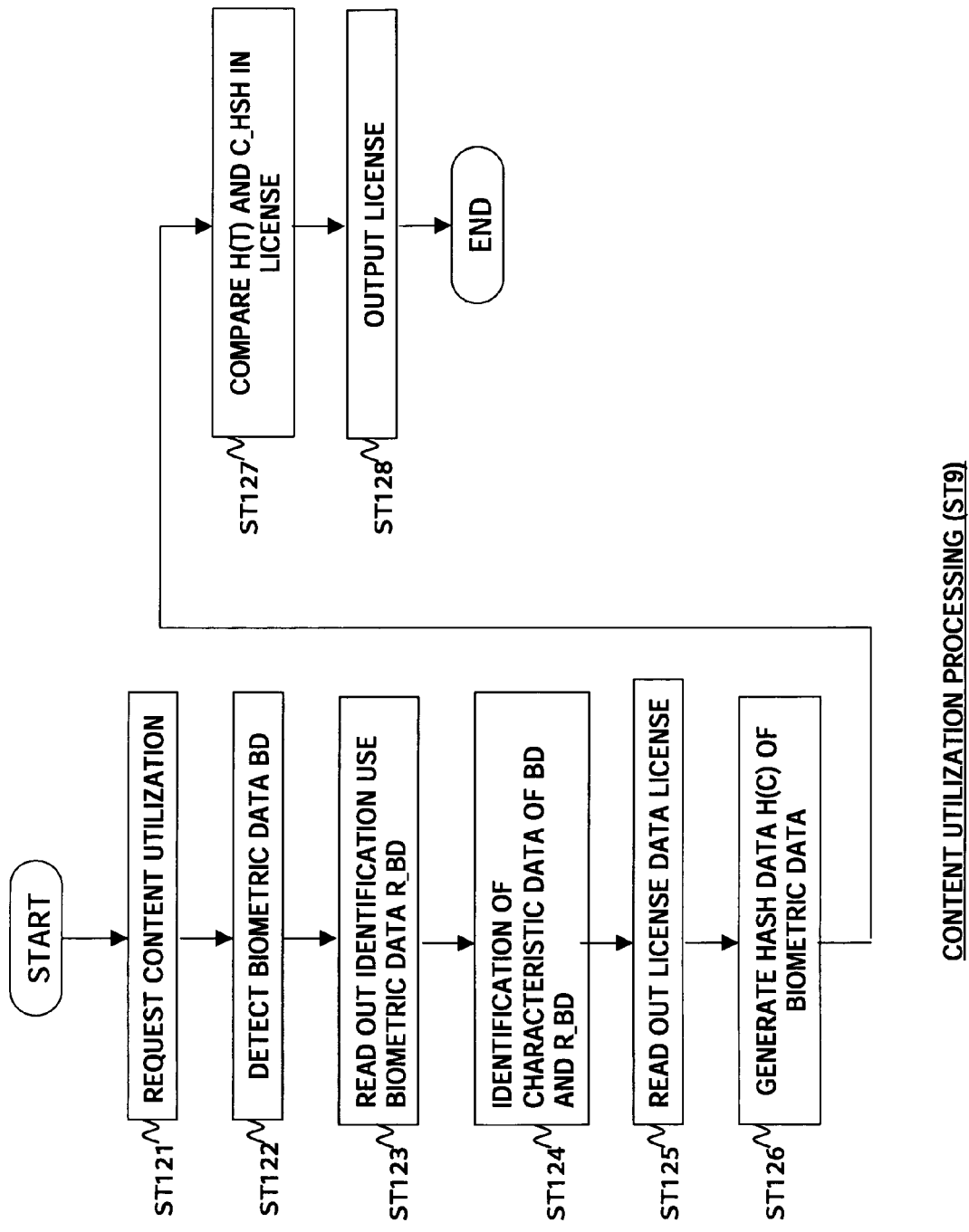
FIG. 28 is a diagram for explaining the content utilization processing ST9 shown in FIG. 5.
Figure 29:
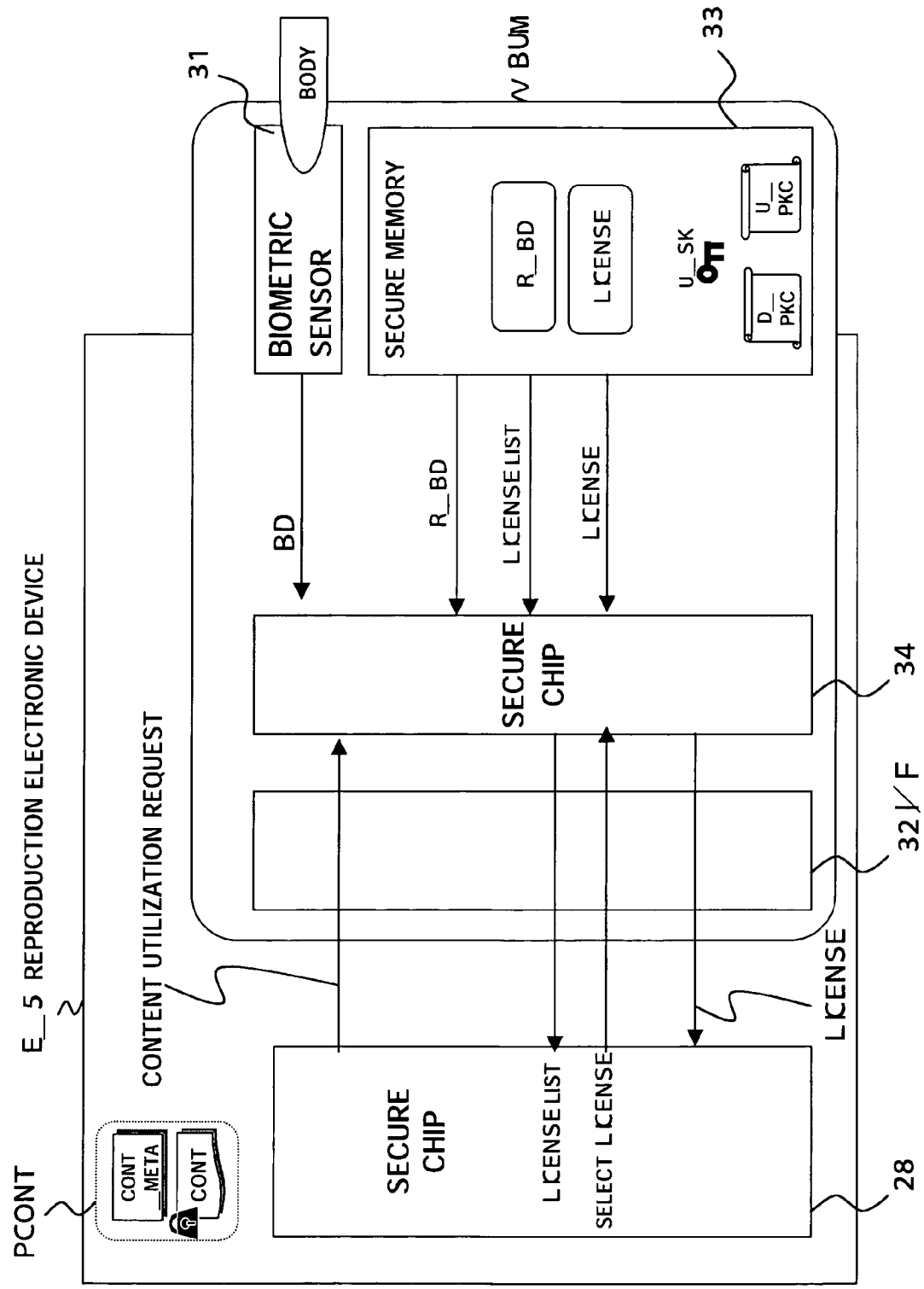
FIG. 29 is a diagram for explaining the content utilization processing ST9 shown in FIG. 5.

FIG. 28 and FIG. 29 are diagrams for explaining the content utilization processing. Below, an explanation will be given according to the steps shown in FIG. 28.

Step ST121

For example, a content utilization request is input in accordance with the operation of the reproduction electronic device E_5 by the user.

Step ST122

The biometric sensor 31 of the user biometric processing module BUM detects the biometric data BD from a part (finger) of the user.

Step ST123

The secure chip 34 of the user biometric processing module BUM reads out the identification use biometric data R_BD from the secure memory 33.

Step ST124

The secure chip 34 compares the characteristic data extracted from the biometric data BD input at step ST122 and the main biometric data in the identification use biometric data R_BD read out at step ST123 and, when judging the user to be the legitimate user, proceeds to step ST125.

Step ST125

The secure chip 34 reads out the list data of the stored license data License from the secure memory 33 and outputs the list data to the secure chip 28 of the reproduction electronic device E_5. The secure chip 28 displays the list data on the display of the reproduction electronic device E_5 and makes the user designate the desired content data. Then, the secure chip 34 reads out the license data License corresponding to the content data designated by the user from the secure memory 33.

Step ST126

The secure chip 34 generates for example the hash data H(C) of the main biometric data of the identification use biometric data R_BD read out at step ST123.

Step ST127

The secure chip 34 compares the hash data H(T) in the license data License read out at step ST125 and the hash data H(C) generated at step ST126 and proceeds to step ST128 when succeeding in the identification.

Step ST128

The secure chip 34 decrypts the license key data L_K read out from the secure memory 33 by the device secret key data D_SK of itself. Then, the secure chip 34 decrypts the content key data CONT_K2 in the license data License read out from the secure memory 33 by the license key data L_K and outputs this to the secure chip 28 of the reproduction electronic device E_5. At this time, the secure chip 34 encrypts the content key data CONT_K2 by session key data generated by mutual authentication with the secure chip 28 and outputs the same to the secure chip 28. The secure chip 28 decrypts the encrypted content data CONT in the package content data PCONT previously received from the search electronic device E_3 by the content key data CONT_K2 and reproduces the same. Note that, the secure chip 34 outputs the data other than the hash data H(T) in the license data License shown in FIG. 27 to the secure chip 28. The secure chip 28 controls for example the reproduction or other utilization of the content data based on the terms-of-use data etc. input from the secure chip 34.

As explained above, according to the data processing system 1, the user biometric processing modules BUM, BUM-A, and BUM-L compare the biometric data BD detected at the biometric sensors 31 in the modules in the secure state by using the identification use biometric data R_BD stored in the secure memories 33 in the modules. For this reason, the user can safely utilize the biometric authentication without providing his or her own identification use biometric data R_BD to the authentication entity. Further, according to the data processing system 1, in P2P communication, the user can prove his or her legitimacy to the other party by biometric authentication by using the user biometric processing module BUM without providing his or her identification use biometric data R_BD to the other party. Due to this, the spread of the biometric authentication can be achieved.

The present invention is not limited to the above-mentioned embodiments.

First Modification

For example, in the above embodiments, the case where the data was input/output in a contact state where the interfaces 32 of the user biometric processing modules BUM, BUM-A, and BUM-L shown in FIG. 3 were attached at the attachment parts of the BUM interface 26 of the electronic device E shown in FIG. 2 was exemplified, but the data may also be input/output in a noncontact state by the proximity wireless communication between the electronic device E and the user biometric processing modules BUM, BUM-A, and BUM-L.

Second Modification

Figure 30:
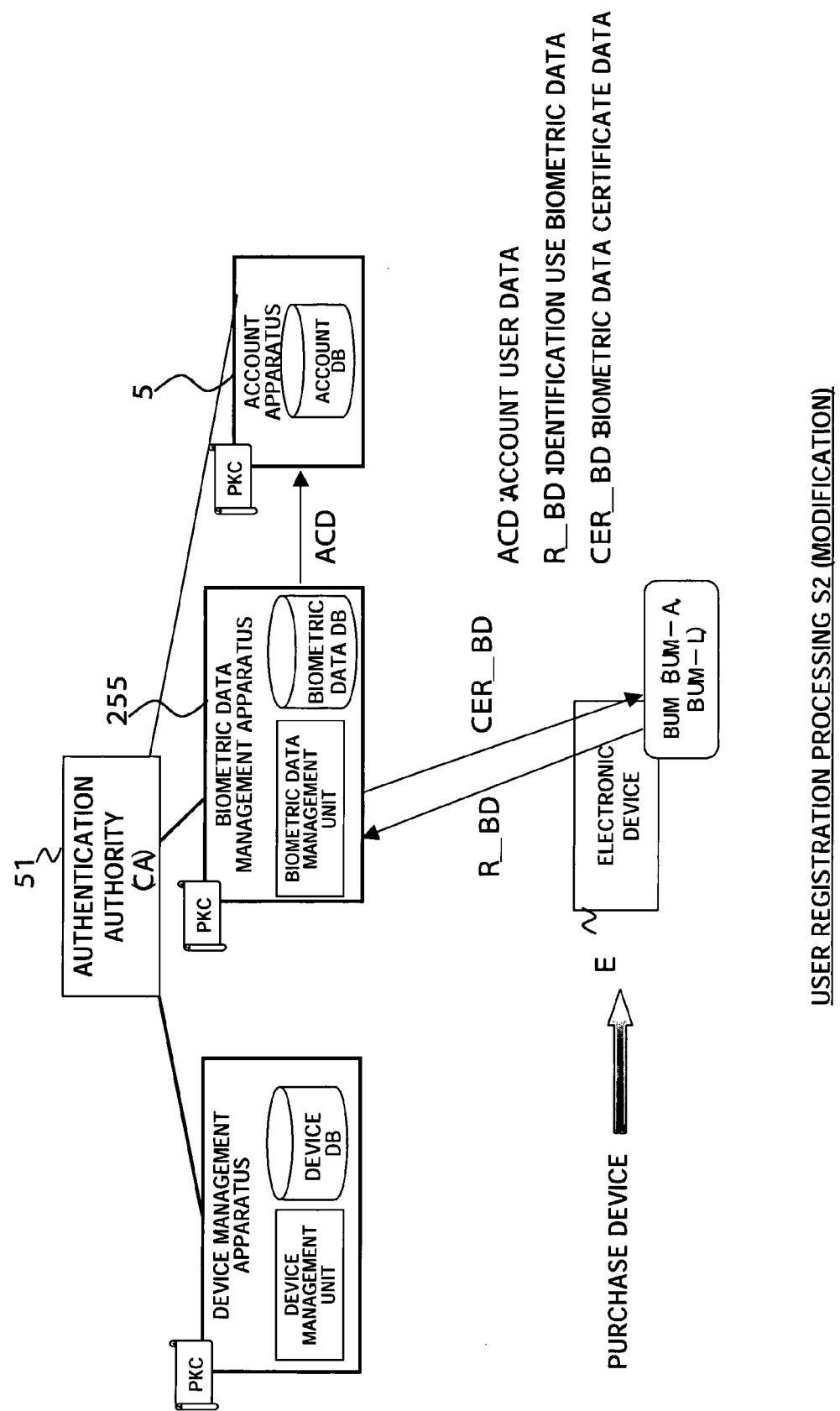
FIG. 30 is a diagram for explaining a second modification of the embodiment of the present invention.

In the present invention, for example as shown in FIG. 30, in the user registration processing (S2), the user biometric processing modules BUM, BUM-A, and BUM-L transmit the user registration request including the identification use biometric data R_BD of the user to the biometric data management apparatus 255 via the electronic device E. The biometric data management apparatus 255 generates the biometric data certificate data CER_RD shown in FIG. 31 in response to the user registration request. As shown in FIG. 31, the biometric data certificate data CER_BD includes the identification data CER_BD_ID thereof, issuant ID, expiration thereof, identification data U_ID of the user, the identification use biometric data R_BD, and the signature data. The issuant ID is the identification data of the biometric data management apparatus 255. The expiration indicates a period where the biometric data certificate data CER_BD is used as valid data. The identification data U_ID is issued by for example the biometric data management apparatus 255. The identification use biometric data R_BD is encrypted by the public key data of for example the biometric data management apparatus 255. The signature data is generated based on the secret key data of the biometric data management apparatus 255.

The biometric data management apparatus 255 transmits the biometric data certificate data CER_BD via the electronic device E to the user biometric processing modules BUM, BUM-A, and BUM-L of the transmission side of the user registration request. The user biometric processing modules BUM, BUM-A, and BUM-L write the biometric data certificate data CER_BD into the secure memory 33 shown in FIG. 3. In the present modification, in the processing for generation of the license meta data L_META explained by using FIG. 16 etc., the secure chip 34 reads out the biometric data certificate data CER_BD from the secure memory 33 and stores the identification data CER_BD_ID thereof in the license meta data L_META. Specifically, use is made of the identification data CER_BD_ID as the maker ID shown in FIGS. 18A and 18B. Further, in the present modification, in place of the hash data H(T) of the identification use biometric data R_BD, use is made of the biometric data certificate data CER_BD as explained by using FIG. 26 etc. By this, for example, as shown in FIG. 32A and FIG. 32B, in the coupon generation request R_Coupon and the coupon data Coupon, in place of the hash data H(T) of the identification use biometric data R_BD, the biometric data certificate data CER_BD is stored. According to the present modification as well, the same effects as those of the above-mentioned embodiments are obtained.

Summarizing the industrial applicability of the invention, the present invention can be applied to the system for performing authentication utilizing the biometric data.

It should be understood by those skilled in the art that various modifications, combinations, sub-combinations, and alterations may occur depending on design requirements and other factors insofar as they are within the scope of the appended claims or the equivalents thereof.

I claim:

1. A biometric identification system comprising:
    an interface for data input/output with an attached electronic device or data input/output by proximity wireless communication with the electronic device,
    biometric data detecting means for acquiring the biometric data from a living subject,
    a memory for storing identification use biometric data used for biometric identification in a secure state, and controlling means for comparing the biometric data acquired by the biometric data detecting means with the identification use biometric data stored in the memory for identification and for outputting a predetermined request or predetermined data to the electronic device via the interface on the condition that the controlling means detects a match between the biometric data and the identification use biometric data, the controlling means including a hash of the identification use biometric data into the predetermined request or predetermined data, and the controlling means not transmitting either an encrypted form of the identification use biometric data or an unencrypted form of the identification use biometric data to the electronic device.

2. The biometric identification system as set forth in claim 1, wherein said interface receives as input a license meta data generation request including content identification data identifying content data and said content key data used for encryption of said content data, said memory stores the meta data key data, and said control means encrypts said content key data input via said interface by said meta data key data read out from said memory, generates license meta data including said encrypted content key data and said content identification data, and outputs this via said interface to said electronic device.

3. The biometric identification system as set forth in claim 1, wherein said interface receives as input a license request including the license meta data including content key data encrypted by meta data key data and content identification data identifying the content data and said meta data key data encrypted by public key data of said biometric identification system, said memory stores the license key data, secret key data of said biometric identification system, and public key data of a biometric identification system at the destination of said content data, and said control means decrypts said meta data key data input via said interface by said secret key data read out from said memory, decrypts said content key data input via said interface by the meta data key data decrypted, then encrypts this by the public key data of the destination biometric identification system, generates license data including said encrypted content key data and content identification data, and outputs this via said interface to said electronic device.

4. The biometric identification system as set forth in claim 3, wherein said interface receives as input said license request further including judgment data for judging if said destination meets predetermined conditions, and said control means generates said license data conditional on said judgment data meeting predetermined conditions.

5. The biometric identification system as set forth in claim 4, wherein said interface receives as input said judgment data further including hash data of said identification use biometric data stored in a secure state in the biometric identification system corresponding to said destination, and said control means generates said license data further including said hash data.

6. The biometric identification system as set forth in claim 1, wherein said interface receives as input license data including content key data encrypted by public key data of said biometric identification system and content identification data, and said memory stores secret key data of said biometric identification system, and said control means decrypts said content key data input from the interface using said secret key data read out from said memory and outputs it via said interface to said electronic device.

7. The biometric identification system as set forth in claim 6, wherein said interface receives as input said license data further including predetermined hash data, and said control means generates hash data of said identification use biometric data read out from said memory, compares said generated hash data with said predetermined hash data input from said interface, and, conditional on succeeding in identification, outputs said decrypted content key data to said electronic device via said interface.

8. The biometric identification system as set forth in claim 2, wherein said control means generates said license meta data further including identification data of biometric data certificate data proving legitimacy of said identification use biometric data.

9. A biometric identification system comprising:
an interface configured to input and output data with an attached electronic device or data input/output by proximity wireless communication with the electronic device,
a biometric data detecting circuit configured to acquire the biometric data from a living subject,
a memory configured to store identification use biometric data used for biometric identification in a secure state, and
a controlling circuit configured to compare the biometric data acquired by the biometric data detecting circuit with the identification use biometric data stored in the memory for identification and to output a predetermined request or predetermined data to the electronic device via the interface on the condition that the controlling circuit detects a match between the biometric data and the identification use biometric data, the controlling circuit including a hash of the identification use biometric data into the predetermined request or predetermined data, and the controlling circuit not transmitting either an encrypted form of the identification use biometric data or an unencrypted form of the identification use biometric data to the electronic device.

10. The biometric identification system as set forth in claim 9, wherein said biometric data detecting circuit is configured to acquire fingerprint data from a living subject.

11. The biometric identification system as set forth in claim 9, wherein said biometric data detecting circuit is configured to acquire vein pattern data from a living subject.

12. The biometric identification system as set forth in claim 9, wherein said biometric data detecting circuit is configured to acquire retinal pattern data from a living subject.

13. The biometric identification system as set forth in claim 9, wherein said biometric data detecting circuit is configured to acquire voiceprint pattern data from a living subject.

* * * * *